(12) United States Patent
Weaver et al.

(10) Patent No.: US 11,933,261 B2
(45) Date of Patent: Mar. 19, 2024

(54) METHODS FOR HARNESSING WAVE ENERGY

(71) Applicant: Aqua Satellite, Inc., Menlo Park, CA (US)

(72) Inventors: Matthew DeVore Weaver, Aptos, CA (US); George Edward Homsy, Mount Shasta, CA (US); Travis Leland Manderson, Calgary (CA)

(73) Assignee: Aqua Satellite, Inc., Menlo Park, CA (US)

( * ) Notice: Subject to any disclaimer, the term of this patent is extended or adjusted under 35 U.S.C. 154(b) by 212 days.

(21) Appl. No.: 17/673,479

(22) Filed: Feb. 16, 2022

(65) Prior Publication Data

US 2022/0260047 A1    Aug. 18, 2022

Related U.S. Application Data

(60) Provisional application No. 63/226,133, filed on Jul. 27, 2021, provisional application No. 63/150,045, filed on Feb. 16, 2021.

(51) Int. Cl.
| | |
|---|---|
| *F03B 13/14* | (2006.01) |
| *B60L 8/00* | (2006.01) |
| *B60L 53/00* | (2019.01) |
| *B63B 79/15* | (2020.01) |

(Continued)

(52) U.S. Cl.
CPC ............... *F03B 13/14* (2013.01); *B60L 8/00* (2013.01); *B60L 53/00* (2019.02); *B63B 79/15* (2020.01);

(Continued)

(58) Field of Classification Search
CPC .......... F03B 13/14; F03B 13/183; B60L 8/00; B60L 53/00; B60L 2200/32; B63B 79/15;

(Continued)

(56) References Cited

U.S. PATENT DOCUMENTS 2,501,696 A * 3/1950 Souczek ............... F03B 17/061
   416/85
4,170,738 A * 10/1979 Smith ................... F03B 13/185
   416/64

(Continued)

FOREIGN PATENT DOCUMENTS

WO    WO-2014120402 A2 *   8/2014    ............ F03B 13/148

*Primary Examiner* — Sizo B Vilakazi
*Assistant Examiner* — Brian R Kirby
(74) *Attorney, Agent, or Firm* — Kilpatrick Townsend & Stockton LLP

(57) ABSTRACT

A method for harnessing wave energy includes providing a vehicle to a body of water, the vehicle. The method includes submerging the vehicle to a depth in the body of water. The method includes operating the motor-generator of the vehicle in the first quadrant of the motor-generator. The method includes detecting a phase of a wave in the body of water based information from the processor of the detected phase. The method includes orienting the vehicle to lag the phase of the wave based on the detected phase of the wave. The method includes synchronizing an inertial acceleration of the vehicle to movement of the wave. The method includes switching the motor-generator to the second quadrant for generation mode to convert energy from the movement of the wave to electrical energy. The method includes storing the energy from the wave in the rechargeable battery source.

38 Claims, 23 Drawing Sheets

(51) Int. Cl.
  *G05D 1/00*  (2006.01)
  *G05D 1/02*  (2020.01)
  *G05D 1/04*  (2006.01)
  *G05D 1/06*  (2006.01)
  *G05D 1/08*  (2006.01)
  *H02K 7/18*  (2006.01)

(52) U.S. Cl.
  CPC ......... *F03B 13/148* (2013.01); *G05D 1/0206* (2013.01); *G05D 1/048* (2013.01); *G05D 1/0692* (2013.01); *G05D 1/0875* (2013.01); *H02K 7/1823* (2013.01); *B60L 2200/32* (2013.01); *F05B 2220/706* (2013.01); *F05B 2240/95* (2013.01); *F05B 2260/42* (2013.01)

(58) Field of Classification Search
  CPC .......... B63B 2035/4466; G05D 1/0206; G05D 1/08; H02K 7/1823; F05B 2220/706; F05B 2240/95; F05B 2260/42; F05B 2270/301; F05B 2270/3015; F05B 2270/342; F05B 2270/202; B63G 8/18; B63G 2008/004; B63J 2003/046
  USPC .......................................... 701/70
  See application file for complete search history.

(56) References Cited

U.S. PATENT DOCUMENTS

| | | | | |
|---|---|---|---|---|
| 4,219,303 A * | 8/1980 | Mouton, Jr. | .......... | F03B 17/061 416/85 |
| 4,383,182 A * | 5/1983 | Bowley | ................ | F03B 17/061 416/85 |
| 7,129,596 B2 * | 10/2006 | Macedo | .................. | F03D 3/068 290/55 |
| 7,339,285 B2 * | 3/2008 | Negron Crespo | .. | F03B 13/1815 290/53 |
| 8,246,293 B2 * | 8/2012 | Landberg | .............. | F03B 17/061 415/3.1 |
| 8,884,455 B2 * | 11/2014 | Reimer | .................. | F03B 13/16 290/53 |
| 8,937,395 B2 * | 1/2015 | Siegel | .................... | F03B 13/183 290/53 |
| 8,939,804 B2 * | 1/2015 | Duke | ..................... | B63G 8/001 440/9 |
| 9,051,037 B2 * | 6/2015 | Hine | ........................ | B63H 1/36 |
| 9,816,480 B2 * | 11/2017 | Akimoto | ............... | F03B 13/183 |
| 10,472,034 B1 * | 11/2019 | Webb | ....................... | B63G 8/14 |
| 2006/0175996 A1 * | 8/2006 | Tether | ....................... | B60L 7/10 318/376 |
| 2010/0127500 A1 * | 5/2010 | Yang | ......................... | F03G 7/08 290/53 |
| 2010/0302901 A1 * | 12/2010 | Welker | ................. | G01V 1/3843 367/21 |
| 2011/0266086 A1 * | 11/2011 | Welker | ...................... | G01S 5/26 181/122 |
| 2012/0020185 A1 * | 1/2012 | Welker | ................. | G01V 1/3843 367/19 |
| 2012/0289103 A1 * | 11/2012 | Hudson | ................... | F42B 19/06 290/1 R |
| 2012/0319406 A1 * | 12/2012 | Hoffmann | ............. | F03B 13/183 415/13 |
| 2013/0229013 A1 * | 9/2013 | Scharmann | ........... | F03B 17/062 290/53 |
| 2017/0350558 A1 * | 12/2017 | Heinen | ................. | F01K 27/005 |

* cited by examiner

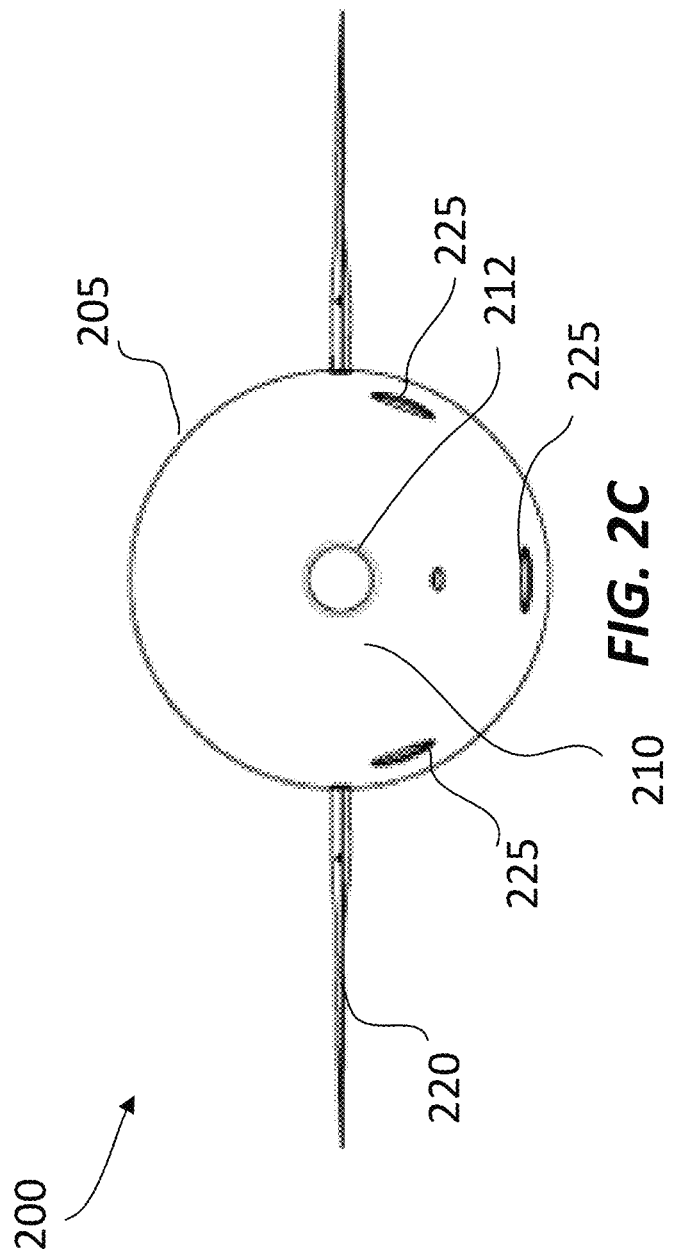

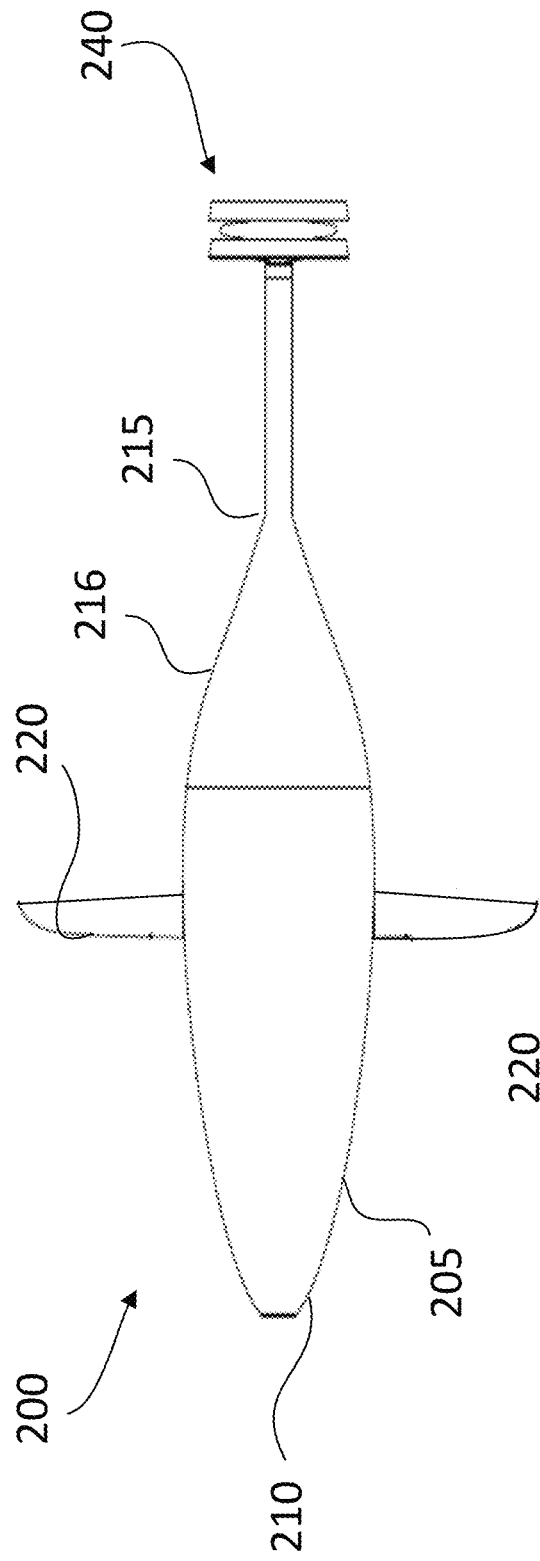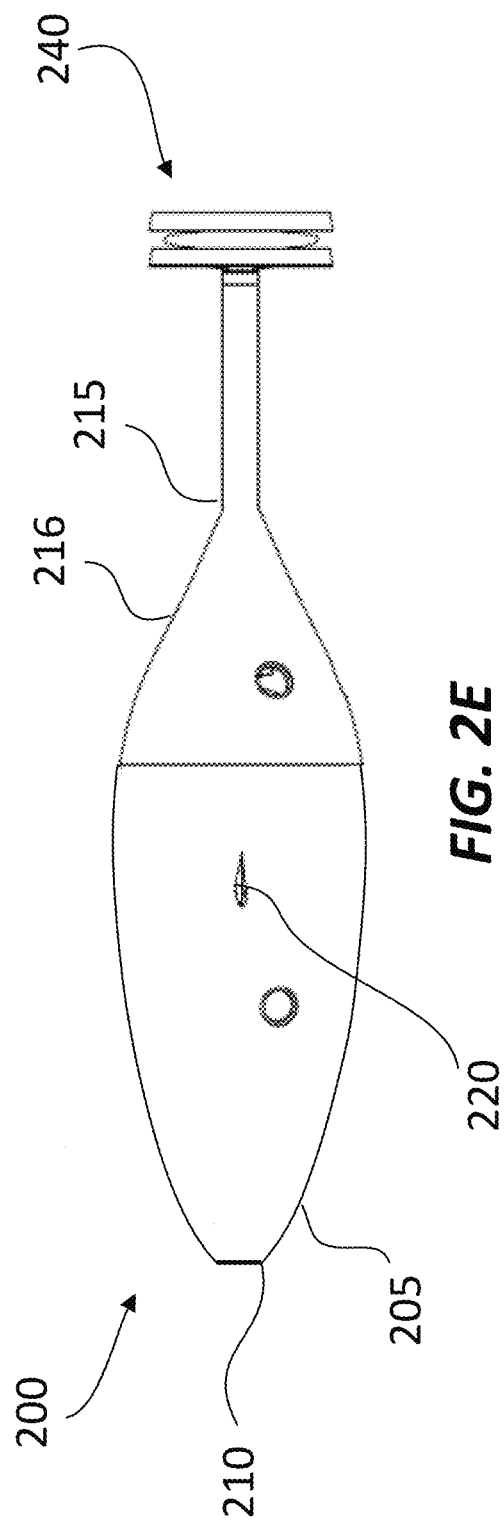

METHODS FOR HARNESSING WAVE ENERGY

CROSS-REFERENCE TO RELATED APPLICATION

This application claims the benefit of and priority to U.S. Provisional Application No. 63/150,045, filed Feb. 16, 2021, and U.S. Provisional Application No. 63/226,133, filed Jul. 27, 2021, the disclosures of which are hereby incorporated by reference in their entirety.

BACKGROUND OF THE INVENTION

Concerns regarding the limited resources of traditional combustible hydrocarbon fuel sources and harmful emissions resulting from their use, has prompted considerable research into sustainable energy sources such as waves, wind, tidal, geothermal, and solar. While significant technological advances have been made in the conversion of energy from some of these alternative energy sources, they are prone to few disadvantages, for example, lack of continuous source of energy. When compared with wind, geothermal, solar, etc., ocean waves are an attractive source of renewable energy.

Ocean wave energy is abundant, constant, well distributed around the globe and near most of the world's population. Ocean waves are generated in an ocean region by wind acting upon an upper surface of the ocean region. Wind is caused by spatial differences in atmospheric temperature from solar radiation being absorbed at the Earth. Further, ocean waves are effectively surface waves which are devoid of any general overall flow of ocean water, but merely an oscillating motion of water about a mean position. The energy content of ocean waves reduces with depth from an upper ocean surface at a rate depending upon ocean wave wavelength. These waves have ample kinetic energy which can be used to produce power. In a similar manner to other types of waves, for example, electromagnetic waves, ocean waves can be reflected, diffracted, refracted, and absorbed.

Despite the progress made in the area of harnessing energy from renewable energy sources, methods are needed that can harness sufficient energy from waves to meet energy needs during deep water exploration.

SUMMARY OF THE INVENTION

The present disclosure relates to methods for harnessing wave energy to provide a renewable source of energy for underwater vehicles (e.g., AUVs). In particular, the present disclosure provides methods and systems for harnessing wave energy that can significantly expand search areas, reduce costs, and provide longer times for deep-water exploration.

Embodiments of the present disclosure include a method of harnessing wave energy. The method includes providing a vehicle to a body of water. The vehicle may include a vehicle body comprising two or more wings; a phase detection system comprising a plurality of pressure taps disposed around the vehicle body; a processor for processing information from the phase detection system to detect a phase of a wave motion; a rotor coupled to a motor-generator, wherein the motor-generator comprises a first quadrant for motor mode and a second quadrant for generation mode; and a rechargeable battery coupled to the motor-generator. The method includes submerging the vehicle to a depth in the body of water. The method includes operating the motor-generator of the vehicle in the first quadrant of the motor-generator. The method includes detecting a phase of a wave in the body of water based on information from the processor of the detected phase. The method includes orienting the vehicle to lag the phase of the wave based on the detected phase of the wave. The method includes synchronizing an inertial acceleration of the vehicle to movement of the wave. The method includes switching the motor-generator to the second quadrant for generation mode to convert energy from the movement of the wave to electrical energy. The method includes storing the electrical energy derived from the wave in the rechargeable battery. In some embodiments, the vehicle travels in a loop trajectory relative to the movement of the wave. In some embodiments, the vehicle is oriented to be perpendicular to an orbit velocity of the wave. In some embodiments, the vehicle begins inertial acceleration in the loop trajectory at an initial position to a final position, wherein the initial position and the final position are substantially the same position. In some embodiments, the movement of the wave forces the vehicle from the initial position to the final position after the inertial acceleration of the vehicle is synchronized with the wave motion. In some embodiments, the two or more wings of the vehicle provide a lift and to drag ratio ranging from 14:1 to 40:1. In some embodiments, a ratio of a volume of the vehicle body, raised to the two-thirds power ($V^{2/3}$), to a total surface area of the two or more wings ranges from 2:1 to 10:1. In some embodiments, the method includes adjusting, iteratively, an orientation and velocity of the vehicle based on the detected phase of the wave. In some embodiments, synchronizing an inertial acceleration of the vehicle to movement of the wave comprises continually adjusting, iteratively, a velocity and a radius of travel in the loop trajectory. In some embodiments, the phase detection system detects one of a crest, backside, trough, and face of the wave to determine an orientation of the vehicle. In some embodiments, the vehicle lags the phase of the wave from 60° to 120° based on an orbit of the wave. In some embodiments, the vehicle lags the phase of the wave by about 90°. In some embodiments, synchronizing the inertial acceleration of the vehicle to movement of the wave comprises providing an initial thrust to synchronize movement of the vehicle with the movement of the wave. In some embodiments, orienting the vehicle to lag the phase of the wave comprises tilting the vehicle perpendicular to an orbit velocity of the wave. In some embodiments, the vehicle body comprises an elliptical body comprising a nose region and a tail region, wherein the nose region is rounded and the tail region includes a gradient to a point. In some embodiments, the movement of the wave provides a tangential lift to the vehicle that is greater than a drag of the vehicle.

Embodiments of the present disclosure include a method of surveying a body of water. The method includes providing a vehicle to a body of water. The vehicle includes a vehicle body comprising two or more wings; a phase detection system comprising a plurality of pressure taps disposed around the vehicle body; a processor for processing information from the phase detection system to detect a phase of a wave motion; a rotor coupled to a motor-generator, wherein the motor-generator comprises a first quadrant for motor mode and a second quadrant for generation mode; and a rechargeable battery coupled to the motor-generator. The method includes operating the motor-generator of the vehicle in the first quadrant of the motor-generator. The method includes surveying the body of water. The method includes determining a battery power of the rechargeable battery. The method includes detecting a phase of a wave in the body of water based on information from the processor of the detected phase. The method includes orienting the vehicle to lag the phase of the wave based on the detected phase of the wave. The method includes synchronizing an inertial acceleration of the vehicle to movement of the wave. The method includes switching the motor-generator to the second quadrant for generation mode to convert energy from the movement of the wave to electrical energy. The method includes storing the electrical energy derived from the wave in the rechargeable battery. In some embodiments, the vehicle includes at least one sonar device, wherein surveying comprises using the at least one sonar device to map the body of water. In some embodiments, the vehicle travels in a loop trajectory relative to the movement of the wave. In some embodiments, the vehicle is oriented to be perpendicular to an orbit velocity of the wave. In some embodiments, the vehicle begins inertial acceleration in the loop trajectory at an initial position to a final position, wherein the initial position and the final position are substantially the same position. In some embodiments, the movement of the wave forces the vehicle from the initial position to the final position after the inertial acceleration of the vehicle is synchronized with the wave motion. In some embodiments, the method includes adjusting, iteratively, an orientation and velocity of the vehicle based on the detected phase of the wave. In some embodiments, synchronizing an inertial acceleration of the vehicle to movement of the wave comprises continually adjusting, iteratively, a velocity and a radius of travel in the loop trajectory. In some embodiments, the phase detection system detects one of a crest, backside, trough, and face of the wave to determine an orientation of the vehicle. In some embodiments, the vehicle lags the phase of the wave from 60° to 120° based on an orbit of the wave. In some embodiments, the vehicle body comprises an elliptical body comprising a nose region and a tail region, wherein the nose region is rounded and the tail region includes a gradient to a point.

Embodiments of the present disclosure include a method of harnessing wave energy. The method includes providing a vehicle to a body of water. The vehicle may include a vehicle body; a phase detection system comprising a plurality of pressure taps disposed around the vehicle body, wherein the phase detection system is configured to detect a plurality of parameters of a wave; a processor for processing information from the phase detection system to detect wave motion; a rotor coupled to a motor-generator, wherein the motor-generator comprises a first quadrant for motor mode and a second quadrant for generation mode; and a rechargeable battery coupled to the motor-generator. The method includes submerging the vehicle to a depth in the body of water. The method includes detecting one or more parameters of the wave in the body of water based on information from the processor. The method includes navigating the vehicle to a position adjacent a surface of the wave, wherein the position is based on the one or more parameters of the wave. The method includes surfing underneath the wave. In some embodiments, the plurality of parameters of the wave include wave velocity, wave length, wave period, wave frequency, wave height, or combinations thereof. In some embodiments, the detected parameter of the wave is the period of the wave, wherein the wave is a short period wave. In some embodiments, the position of the vehicle is under a leading face of the wave adjacent the surface of the body of water. In some embodiments, the vehicle is between a crest and a trough of the wave. In some embodiments, the vehicle is positioned underneath a surface of the wave by 1 to 5 times a diameter of the vehicle. In some embodiments, the wave is bow wave based on the detected parameters of the wave. In some embodiments, the bow wave is produced from a ship. In some embodiments, wherein the vehicle further comprises sonar sensors to detect large ships that can produce bow waves. In some embodiments, the method includes switching the motor-generator to the second quadrant for generation mode to convert energy from movement of the wave to electrical energy when surfing the wave. In some embodiments, the method includes storing the electrical energy derived from the wave in the rechargeable battery.

Numerous benefits are achieved by way of the present disclosure over conventional methods and systems of using renewable energy sources to power underwater vehicles. For example, embodiments of the present invention provide methods that harness wave energy that can increase the spatial coverage of an underwater vehicle for improved understanding, monitoring, and management of the ocean. The methods described herein provide underwater vehicles suitable for a wide range of applications, and more particularly to an underwater vehicles configured to generate and store electrical power derived from movement (e.g., synchronized movement) with waves. These and other embodiments of the disclosure, along with many of their advantages and features, are described in more detail in conjunction with the text below and attached figures.

BRIEF DESCRIPTION OF THE DRAWINGS

FIGS. 2A-2G illustrate multiple views of an underwater vehicle for harnessing wave energy according to some embodiments.

DETAILED DESCRIPTION OF SPECIFIC EMBODIMENTS

Figure 1:
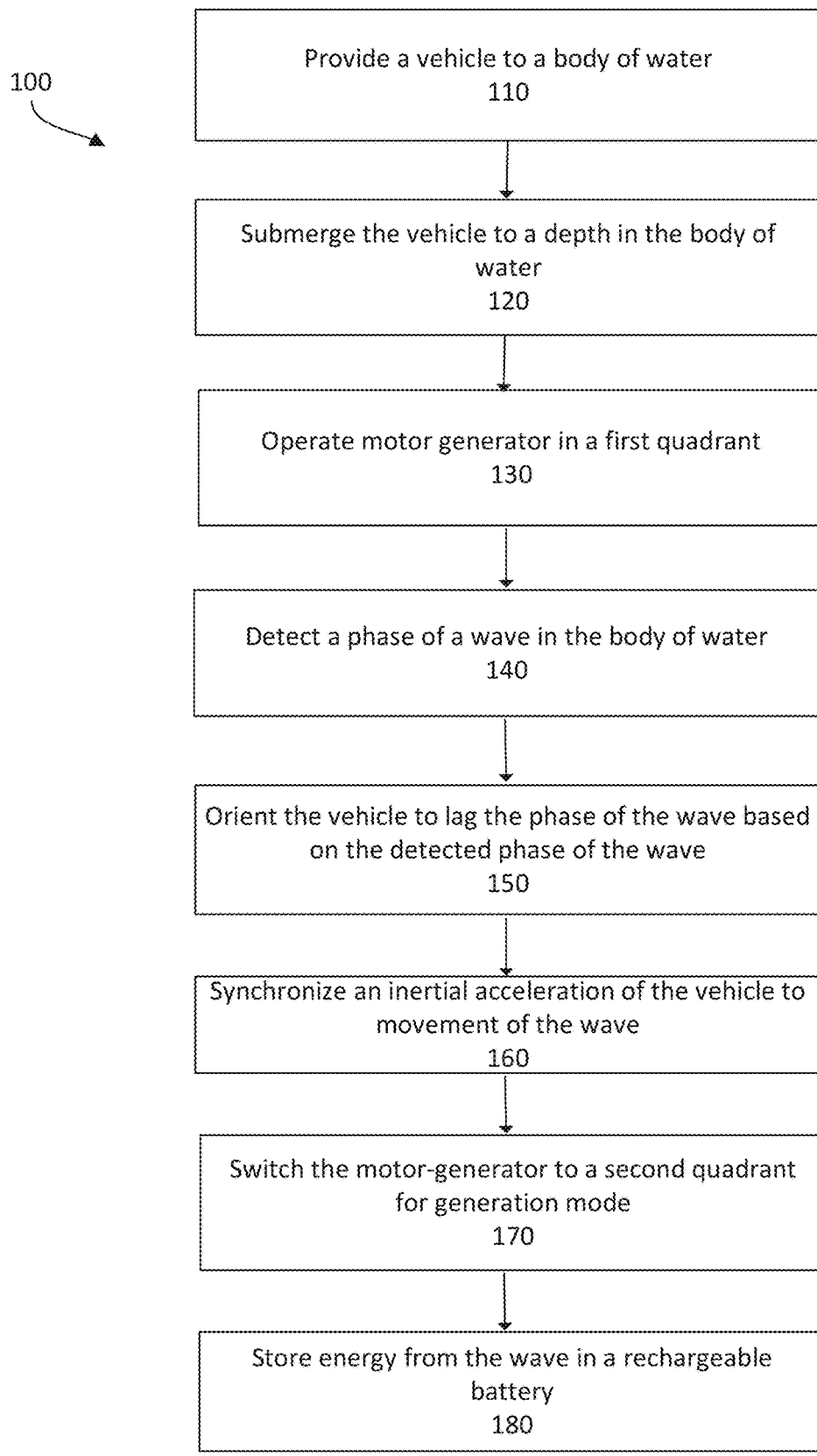
FIG. 1 provides a flow diagram of a method for harnessing wave energy according to some embodiments.

The present disclosure describes a number of embodiments related to a method for harnessing wave energy. In some embodiments, the present disclosure relates to methods of harnessing wave energy including orienting underwater vehicles in positions along a wave particle orbit and synchronizing the movement of the vehicle to extract energy from wave motion. The underwater vehicles described herein include a motor-generator that is configured to provide energy to a rotor system in a motor mode (e.g., first quadrant of motor-generator) and extract energy derived from movement (e.g., synchronized movement) with waves in a generation mode (e.g., second quadrant of motor-generator). Further embodiments of the present disclosure relate to methods of harnessing energy from waves to power underwater vehicles.

There are numerous challenges to integrate renewable energy with underwater vehicles (e.g., autonomous underwater vehicles). In the process of harnessing wave energy, many wave energy converters have been designed and developed. The wave energy converters in general are used to harness power from heave motion, pitch motion, surge motion or by combinations of such motions. Nonetheless, little use has been made of ocean wave energy as most of such technologies fail to produce power efficiently and effectively due to the difficulties in converting wave energy into a useful form such as electricity. The energy systems adapted for generating energy from ocean waves contend with numerous technical challenges.

For example, ocean waves vary greatly in amplitude, wavelength, and complexity with time. Further, ocean wave energy can often be an order of greater magnitude under storm conditions in comparison to normal conditions. Furthermore, situations can arise where ocean wave energy is negligible. Additionally, designers of ocean wave energy systems may need to consider commercial viability of such systems in comparison to alternative systems such as wind turbine power generation systems, hydroelectric power systems, tidal power generation systems, fossil fuel burning power generation systems and nuclear power systems.

Most of the renewable energy systems suffer a problem of requiring costly, robust structures, for example to withstand storm conditions, while generating relatively modest amounts of power when in operation in comparison to a corresponding size of a nuclear power station or fossil fuel power station. Further, most of the conventional wave energy convertors are based on the principle of converting mechanical energy from the waves to electrical energy by using hydraulic/pneumatic systems along with mechanical gear box arrangements and electrical motors. However, these wave energy convertor technologies are sensitive to wave direction. The waves in the offshore region where these generators are positioned may come from any direction and it is not possible to constantly change the orientation of such wave energy convertors according to the wave direction as the wave direction cannot be predicted. The conventional wave energy convertors are often tested under idealized wave conditions to rate their performance. However, in real conditions, the ocean waves are highly irregular and directional. To cater to the unpredictable sea conditions, a robust yet flexible directional, insensitive and mobile technology, which is easy to fabricate, maintain and transmit electricity with minimum loss may be necessary.

According to embodiments of the present invention, methods are provided that enable cheap, efficient, and less-resource intensive ways of performing deep-water surveying by harnessing wave energy. The methods described herein harnesses wave movement to generate and store electrical energy. In typical applications, power generation requires force over time, which involves an anchor force at a flow boundary (e.g., a wave buoy plate, boat keel, turbine tower, kite line, sail car, wheels, etc.). The methods and systems described herein are not anchored and forced, but are free to develop force with the flow of waves. For example, the methods described herein utilize an underwater vehicle that synchronizes inertial acceleration with ocean waves using both lateral (e.g., turning) and axial (e.g., thrusting) movement. The underwater vehicle can move in a flow path that allows the vehicle to extract energy from movement of the wave. For example, the underwater vehicle may include a two-quadrant motor-generator configured to control the speed and orientation of the underwater vehicle in motor mode and convert wave energy into electrical energy in generation mode. When the underwater water vehicle is synchronized with the movement of the waves, slowing down, or coasting, the current flows in reverse to charge the battery, which enhances sustained ability and decreases energy consumption by the battery.

In some embodiments, the method of harnessing wave energy includes detecting a phase of a wave and orienting the vehicle to lag the phase of the wave, which can be referred to as "phase locking." After phase locking, the method may include synchronizing the inertial acceleration of the vehicle with the movement of the wave. For example, the vehicle can move in a loop trajectory, in a direction perpendicular to the wave particle motion, to extract energy from the wave. In some embodiments, the method includes detecting a phase of the wave, orienting the underwater vehicle to an initial position based on the phase of the wave, and synchronizing acceleration with a wave in a loop trajectory. The vehicle can include a two-quadrant motor-generator that can switch to a generation mode after synchronizing movement with the wave. In generation mode, the two-quadrant motor-generator can derive energy from the movement of the wave and store energy in a rechargeable battery. The continuous loop motion trajectory over each wave allows the vehicle to recharge its batteries at any time and at any location. Additionally, the closed and open loop motions of the vehicle provide both power and mobility.

FIG. 1 provides a flow diagram of a method of harnessing wave energy according to some embodiments of the present disclosure. The method 100 may include providing a vehicle to a body of water (110). The vehicle may be provided to the body of water in various ways. In some embodiments, the vehicle may be provided to a surface of the body of water. In some embodiments, the vehicle can be navigated, shipped (e.g., via a boat or submarine), or air-dropped to a target location in the body of water. For example, the vehicle can be circumnavigated from a dock or port to a target location in the body of water. In some embodiments, the vehicle can be an autonomous underwater vehicle (AUV).

The vehicle may include a vehicle body. The vehicle body includes an interior volume for housing components of the vehicle. The vehicle body may be a hollow body having an overall shape that is spherical, spheroid, elliptical, or cylindrical. In some embodiments, the vehicle body comprises a uniformly convex shape to reduce possible catch points on the vehicle. From a hydrodynamic standpoint, the vehicle body may be a flattened elliptical shape characterized by reduced hydrodynamic drag, therefore providing a vehicle with greater range and/or greater sustainable velocity for a given onboard power supply.

The vehicle body may include two or more wings disposed on the vehicle body. In some embodiments, vehicle body may include two wings mounted on opposing sides of the vehicle body. The wings are utilized for the purpose of lift and to control forces acting on the vehicle body. In the ranges of useful lift, the lower bound of drag of wings is limited by induced drag. The induced drag is associated with the inherent deflection and momentum introduced into the flow field by lift and circulation of a wing section. Even if the wing profile had zero drag itself (e.g., no skin friction or pressure drag), the induced drag of wings and wing bodies compared to their volume is multiples of the ratio of drag and useful volume of the bodies. For a given mass or volume and typical speeds, the ideal wing size is typically much too small to contain the mass and volume it can support. Therefore, a non-lifting containment body coupled with an appropriate ideal wing has the potential for superior performance (volume/drag or weight/drag).

The vehicle may include a plurality of inertial sensors disposed around the vehicle body. In some embodiments, the vehicle uses a plurality of inertial sensors to detect an estimate of its position and velocity with respect to wave movement. The vehicle can include inertial sensors that simultaneously detect in all directions about the vehicle. The vehicle may include a processor in communication with the inertial sensors. The processor can determine the current rate of acceleration and changes in rotational attributes, including pitch, roll and yaw, based on data from the inertial sensors. In some embodiments, the data from the inertial sensors is fed communicated to a processor, which uses the data to calculate the current position of the vehicle and the phase of the wave. The inertial sensors can detect accelerations which are integrated by a guidance computer to deduce the position and velocity of the vehicle. The processor processes information from the plurality of inertial sensors to detect a phase of a wave motion.

The vehicle may include a phase detection system. The phase detection system may include a plurality of sensors, including, for example, the aforementioned inertial sensors. The phase detection system may also include a plurality of pressure taps and differential pressure sensors. Each of the pressure taps may comprise a port in the vehicle body that includes a tube for sampling the fluid to measure pressure. The phase detection system may use the plurality of pressure taps to determine parameters of the wave motion. For example, the data from the phase detection can be used to estimate the type of wave (e.g., short period wave, long period wave, bow wave), the velocity of the wave, the height of the wave, the wavelength and period of the wave, and the phase of the wave. In some embodiments, the phase detection system may include thermal flow sensors. In some embodiments, the phase detection system can utilize thermal flow sensors in lieu of the pressure taps. In some embodiments, the phase detection system can utilize both thermal flow sensors and pressure taps. Appendix C provides further details regarding pressure taps and pressure tap placement for phase detection. Appendix C is incorporated by reference in its entirety for all intents and purposes.

Figure 7A:
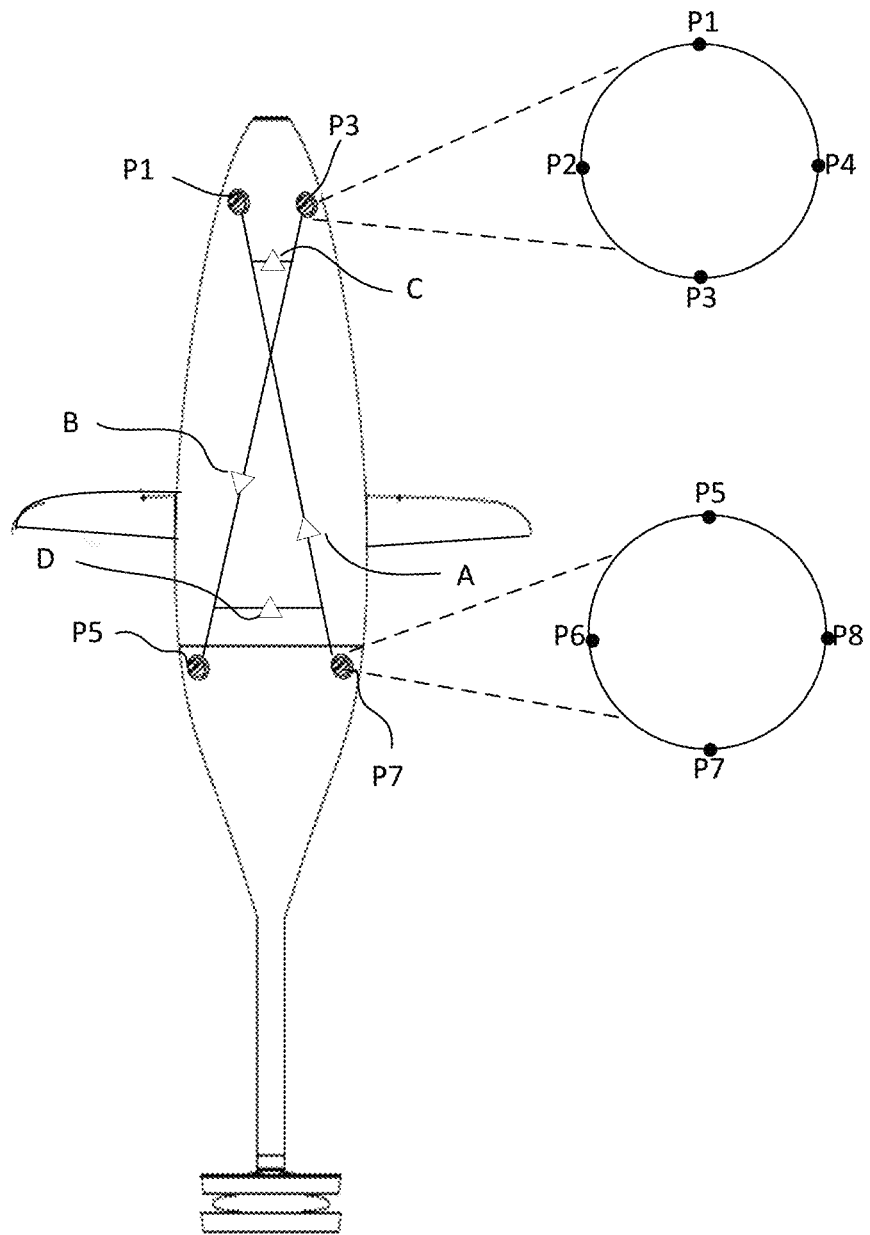
FIGS. 7A and 7B illustrate an exemplary phase detection system and FIG. 7C shows an exemplary velocity detection system according to some embodiments.
Figure 7B:
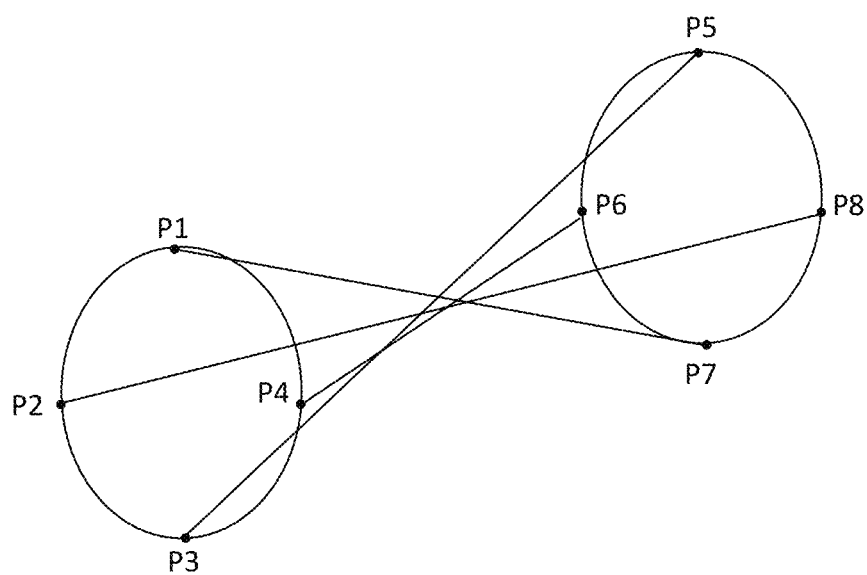

As shown in FIGS. 7A and 7B, the phase detection system of the vehicle may comprise a plurality of pressure taps and differential pressure sensors. Each of the plurality of pressure taps may be located at discrete locations around the vehicle body. In some embodiments, the vehicle may include four pressure taps in each quadrant of the vehicle. For example, the vehicle may include pressure taps P1-P4 adjacent the nose region of the vehicle and pressure taps P5-P8 adjacent the tail region of the vehicle. As shown in the cutaway in FIG. 7A, the pressure taps P1-P4 may be disposed around the circumference of the vehicle body adjacent the nose region. Therefore, pressure taps P2 and P4 may be disposed on an orthogonal plane from pressure taps P1 and P3. Similarly, pressure taps P5-P8 may be disposed around the circumference of the vehicle body adjacent the tail region. Therefore, pressure taps P6 and P8 may be disposed on an orthogonal plane from pressure taps P7 and P5.

Figure 8:
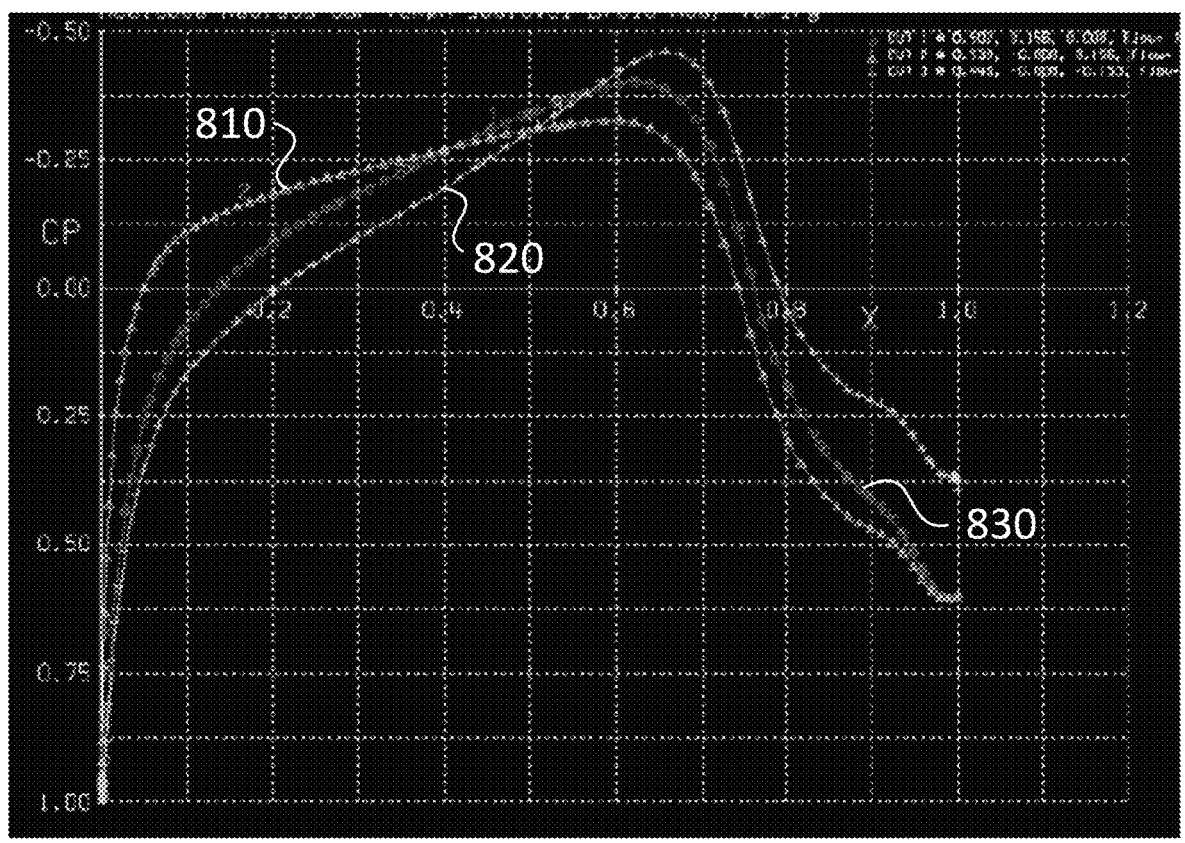
FIG. 8 illustrates a graph of the coefficient of pressure along the length of the vehicle body according to some embodiments.

In some embodiments, the phase detection system includes at least four pressure taps P1-P4 adjacent the nose region of the vehicle. In some embodiments, the pressure taps P1-P4 are located at a region adjacent the nose region having a coefficient of pressure at or near 0. For example, as shown in FIG. 8, which is further described below, the coefficient of pressure at approximately ⅛ the length of the body is approximately 0. FIG. 7A shows the vehicle may include two pressure taps (P1 and P3) separated by an axial distance and positioned from the nose region of the body at approximately ⅛ the length of the body.

In some embodiments, the phase detection system includes at least four pressure taps P5-P8 adjacent the tail region of the vehicle. In some embodiments, the pressure taps P5-P8 are located at a region adjacent the tail region having a coefficient of pressure at or near 0. For example, as shown in FIG. 8, which is further described below, the coefficient of pressure at approximately ¾ the length of the body is approximately 0. FIG. 7A shows the vehicle may include two pressure taps (P5 and P7) separated by an axial distance at approximately ¾ the length of the body.

The vehicle may include a plurality of differential pressure sensors A-D between the pressure taps P1-P8. Each differential pressure sensor measures the difference in pressure between two of the pressure taps. For example, FIG. 7A shows two differential pressure sensors (C and D) between two diametrically opposed pressure taps and two differential pressure sensors (A and B) between axially disposed pressure taps. Pressure tap P1 is diametrically opposed to pressure tap P3. The vehicle may include a differential pressure tap C between pressure tap P1 and pressure tap P3. Additionally, pressure tap P5 is diametrically opposed to pressure tap P7. The vehicle may include differential pressure tap D between pressure tap P5 and pressure tap P7. In some embodiments, the vehicle includes differential sensors along the length of the vehicle body. For example, the vehicle may include differential sensor A between pressure tap P1 and pressure tap P7 and differential sensor B between pressure tap P3 and pressure tap P5. The vehicle may include another set of pressure taps (P2, P4, P6, and P8) and differential pressure sensors along another plane of the vehicle body. In this embodiment, there are a total of eight (8) pressure taps and eight (8) differential sensors.

FIG. 7B provides a schematic diagram of the differential pressure sensors between each pressure taps P1-P8 according to some embodiments. Pressure taps P1-P4 are each located adjacent the nose region of the vehicle and pressure taps P5-P8 are each located adjacent the tail region of the vehicle. In this embodiment, differential pressure sensors can be provided between each of the pressure taps in each quadrant of the vehicle. For example, differential sensors can be provided between pressure taps P1 and P3 and between pressure taps P7 and P5.

The pressure differential sensors between pressure taps P1 and P3 and pressure taps P5 and P7 can be used to detect the pressure difference due to the incidence angle of the flow of water. Conversely, the pressure differential sensors between pressure taps pressure taps P1 and P7 and pressure taps P3 and P5 may be insensitive to incidence angle and to speed. Since these pressure differences between the front and rear of the vehicle can be speed and heading insensitive, this enables measurement of pressure gradients due to the wave going over the vehicle. Thus, in some embodiments, the location of the pressure tap sensors are positioned at points along the vehicle body that are speed and heading insensitive, thus allowing the sensors to sense the pressure from movement of a wave and changes in a wave.

The pressure differential sensors between pressure taps P1 and P3 and between P7 and P5 are located in diametrically opposite positions for incidence angle detection. These are shown as pressure differential sensors C and D in FIG. 7A. These sensors detect the incidence angle of the flow of water impinging on the vehicle. For extensively laminar flow bodies, the moment coefficient is relatively high. Therefore, as the vehicle body is off-axis, the vehicle body tends to destabilize (e.g., tumble) due the pressure differential across the nose region and the tail region. The pressure gradient between the pressure taps (e.g., differential sensors C and D) can be measured to determine the pressure at the nose region and the tail region. As shown in the pressure coefficient chart of FIG. 8, the pressure at the ⅛ position of the vehicle body adjacent the nose (curve 810) minus the pressure at the nose (curve 820) is positive. Correspondingly, the pressure at the ⅞ position of the vehicle body adjacent at the tail (curve 810) minus the pressure at the nose (curve 820) is negative. The incidence angle is instantaneously related to the pressure differentials at these positions. This information can be used to detect the orbital motion of the waves and to apply corrections in pitch, yaw, or roll of the vehicle. These pressure sensors are used to concurrently, e.g., simultaneously, detect the speed of the vehicle and the orbital motion of the waves.

Figure 7C:
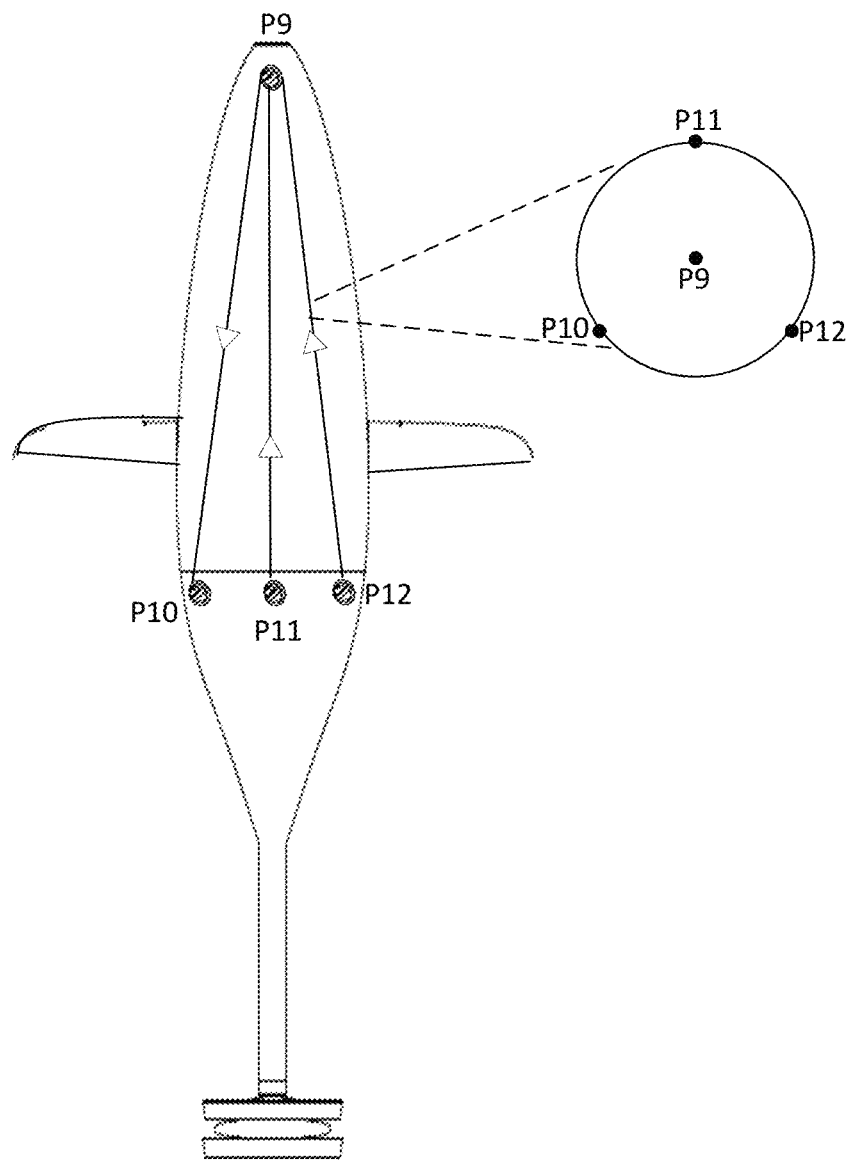
Figure 7D:
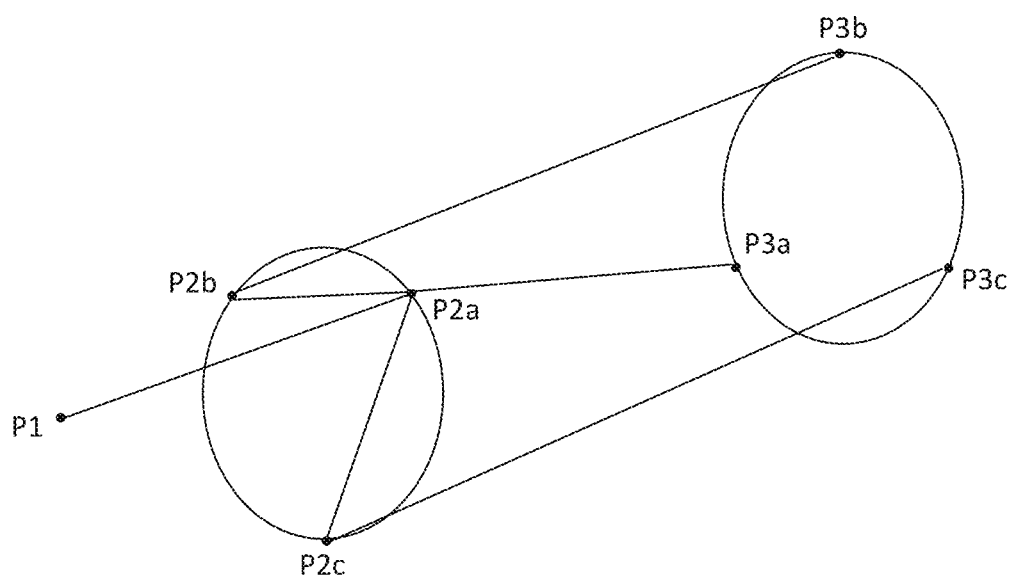
FIG. 7D shows an alternative arrangement of pressure taps on the vehicle body according to some embodiments.

FIG. 7D shows an alternative arrangement of pressure taps and pressure differential sensors according to some embodiments. As shown in FIG. 7D, the vehicle may include pressure tap P1 at or near the nose of the vehicle. The vehicle may include pressure taps 2a-2c adjacent the nose region of the vehicle and pressure taps 3a-3c adjacent the tail region of the vehicle. Pressure taps 2a-2c and pressure taps 3a-3c may be disposed at positions around the circumference of the vehicle body. For example, each of the pressure taps 2a-2c and pressure taps 3a-3c may be separated by about 120° around the circumference of the vehicle body. As shown in FIG. 7D, differential pressure sensors may be located between pressure taps 2a and 3a, pressure taps 2b and 3b, pressure taps 2c and 3c, pressure taps 2a and 2b, pressure taps 2a and 2c, and pressure taps 1 and 2a. In this embodiment, the vehicle may include 7 pressure taps and 6 differential sensors. Advantageously, this embodiment combines velocity-specific and pitch/yaw-specific pressure taps with only marginal reduction in velocity sensitivity and high-sensitivity for pressure gradient.

FIG. 8 shows an aeronautical pressure coefficient plot across the vehicle body length according to some embodiments. The x-axis provides the body length for a total body length of 1 and the y-axis provides the aeronautical pressure coefficient as measured in CP. Curve 810 represents the movement of water over the top of the vehicle body. Curve 830 represents the movement of water over the side (e.g., the waist) of the vehicle body. Curve 820 represents the movement of water over the bottom (e.g., the belly) of the vehicle body. If the vehicle is going directly into the flow of water, the coefficient of pressure is the same for the top, side, and bottom of the vehicle body due to the axisymmetric shape of the vehicle body. As the vehicle body tilts or has a pitch to the flow of water, the coefficient of pressure changes over each of these areas of the vehicle body.

Curve 830 in FIG. 8 shows that two points along the vehicle body have a coefficient of pressure of 0. Therefore, regardless of how fast the vehicle travels, the pressure at these points on the vehicle body will be zero. The vehicle body has two positions at which the pressure does not change regardless of the speed of the vehicle. The pressure taps can be located at these two positions of the vehicle body as discussed above. These positions of the vehicle advantageously are not affected by the vehicle speed when detecting pressure. In some embodiments, the position on the vehicle is at ⅛ of the vehicle body length and ¾ of the vehicle body length. Thus, the position of the pressure taps on the vehicle are advantageous because they are insensitive to differences in dynamic pressure even if the vehicle body is off-axis.

In some embodiments, the vehicle includes a plurality of sensors to detect the phase of the wave. The plurality of sensors can simultaneously detect a location and position of the vehicle and the phase of the wave. For example, the vehicle may include pressure sensors, flow velocity sensors, pressure sensors, and inertial sensors. The vehicle may include a processor that processes the data from each of the sensors to determine a location and position of the vehicle and the phase of the wave. In some embodiments, the vehicle uses a combination of pressure sensors, depth sensors, inertial sensors, and Doppler Velocity Logs (DVLs) to compute an estimate of the position of the vehicle and the phase of the wave.

FIG. 7C shows a plurality of additional pressure taps on the vehicle body according to some embodiments. The pressure taps P9-12 may be used to detect the velocity of vehicle. In some embodiments, pressure tap P9 is located at or near the nose of the vehicle and pressure taps P10-12 are located downstream from pressure tap P9. In some embodiments, pressure taps P10-12 are at or adjacent to a central portion of the vehicle body. For example, the pressure taps P10-12 can be positioned circumferentially at a position that is equivalent to half of the vehicle body length as shown in FIG. 7C. Each of pressure taps P10-12 can be located at discrete locations in a 120° axis around the vehicle body. Each of pressure taps P10-12 are in communication with pressure tap P9. Appendix C provides further details regarding determining vehicle velocity (e.g., speed) using pressure taps. As shown in FIG. 8, the coefficient pressure for each of the heading curves at 50% of the vehicle body length converge and there is a very small difference. Therefore, the pressure differential is measured between pressure tap P9 at the nose region, which has a CP of 1, and each of pressure taps P10-12 at 50% length, which has CP around −0.3, providing a coefficient of pressure differential of 1.3. The negative pressure (below 0 CP) indicates that there is suction at some regions of the vehicle body. The pressure differential multiplied by the dynamic pressure provides the velocity of the vehicle. Once the pressure differential is determined from the pressure taps, the velocity can be measured based on the following formula:

$$\Delta P = 0.5 \rho V^2 (\Delta CP).$$

Figure 9:
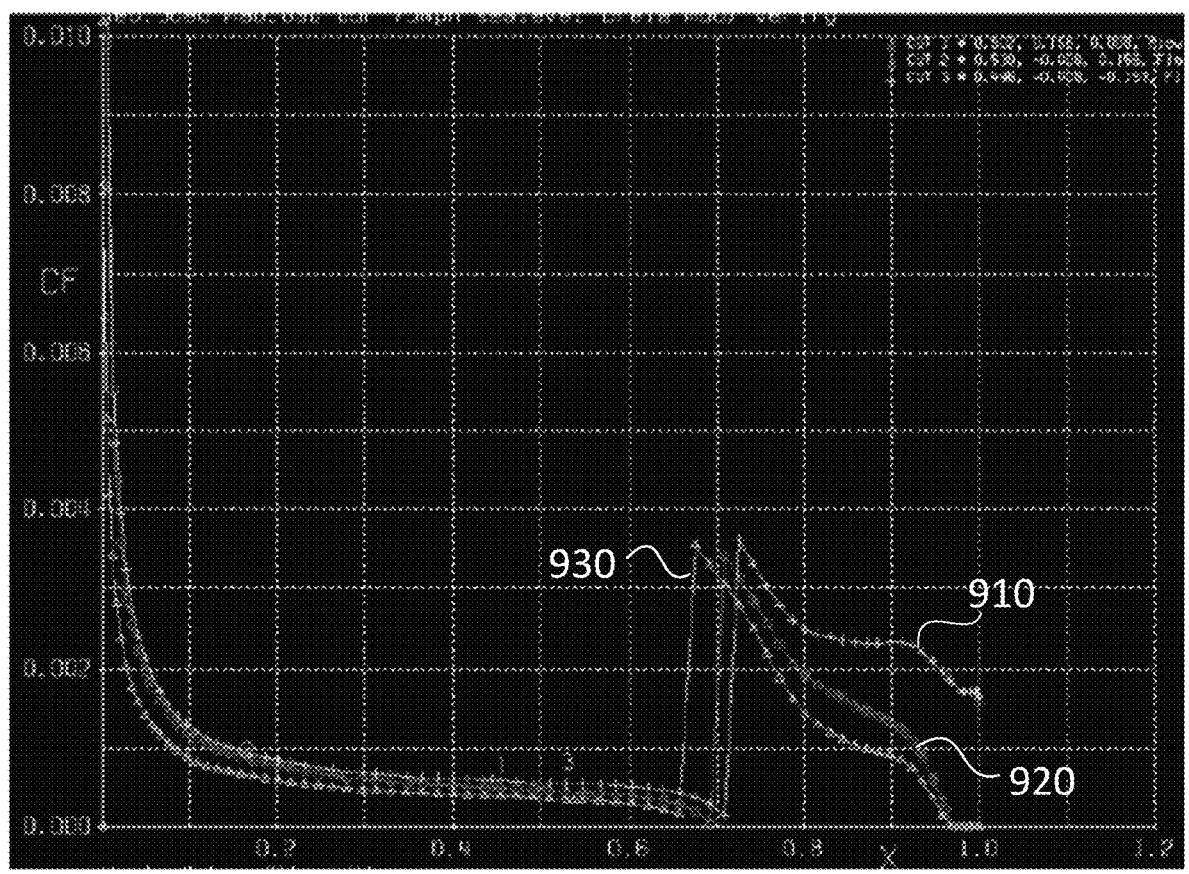
FIG. 9 illustrates a graph of the coefficient of friction along the length of the vehicle body according to some embodiments.

FIG. 9 shows a graph of the local skin friction coefficient (CF) along the length of the vehicle body. Curve 910 represents the local skin friction coefficient along the top of the vehicle body. Curve 930 represents the local skin friction coefficient along the side (e.g., the waist) of the vehicle body. Curve 920 represents the local skin friction coefficient along the bottom (e.g., the belly) of the vehicle body. The x-axis provides the body length of a vehicle having a total body length of 1 and the y-axis provides the coefficient of friction. The drag of the vehicle can be determined from the coefficient of friction along the vehicle body. As shown in FIG. 9, a majority of the vehicle body has a very low local skin friction coefficient. For example, for a vehicle body length from 0.2 to 0.7, the vehicle body is in the laminar flow region with coefficient of friction values less than 0.001. In this region, the water moves almost effortlessly over the vehicle body and applies very little drag. FIG. 9 shows a boundary layer trip around 0.7 of the body length where the coefficient of friction increases. This region corresponds to the region near the tail, which may include some turbulent flow due to converging boundary layers. However, the coefficient of friction quickly diminishes.

Figure 10:
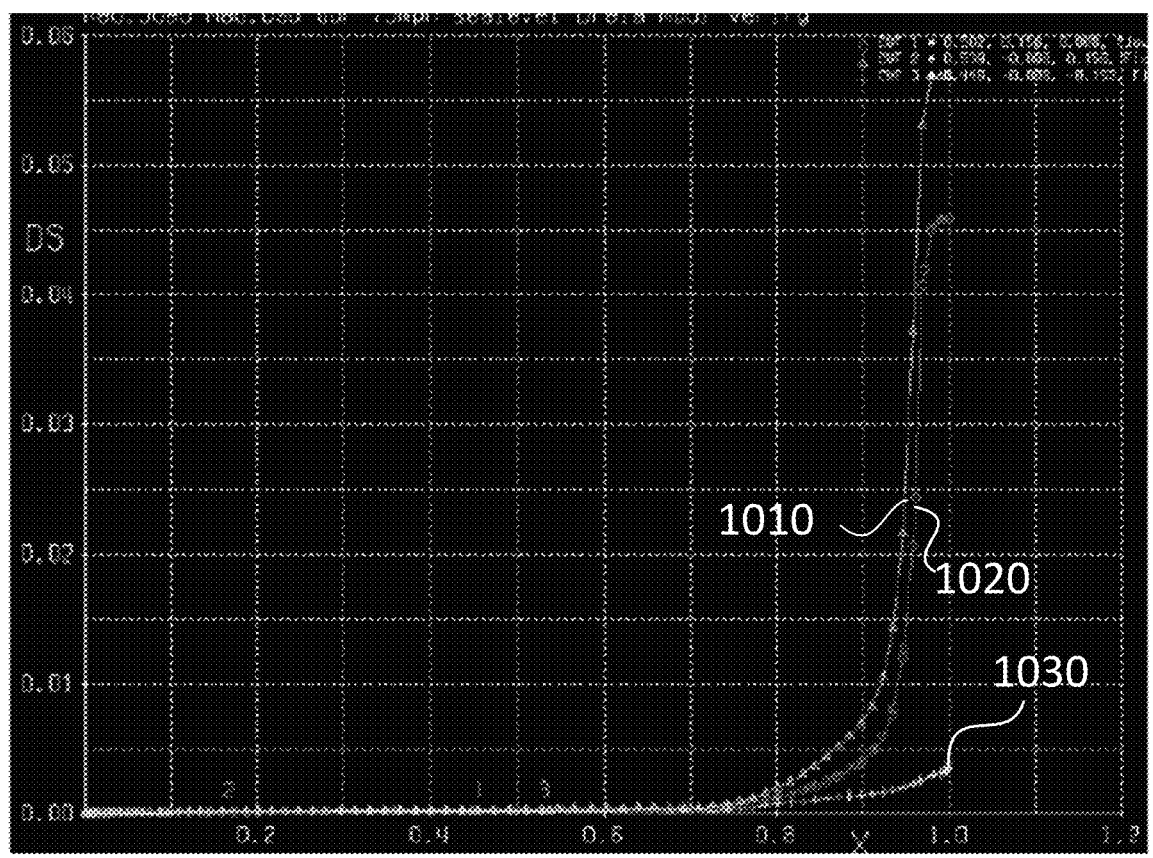
FIG. 10 illustrates a graph of the boundary layer thickness along the length of the vehicle body according to some embodiments.

FIG. 10 shows a graph of the boundary layer thickness relative to the body length. The x-axis provides the body length for a total body length of 1 and the y-axis provides the boundary layer thickness as measured by displacement thickness (DS), which is the boundary layer thickness normalized by the length of the vehicle. The boundary layer is a thin layer of flowing water adjacent to the surface of the vehicle body. Curve 1010 represents the boundary layer thickness along the top of the vehicle body. Curve 1030 represents the boundary layer thickness along the side (e.g., the waist) of the vehicle body. Curve 1020 represents the boundary layer thickness along the bottom (e.g., the belly) of the vehicle body. As shown in FIG. 10, the boundary layer is very thin for a majority of the body, thereby exerting very little drag on the vehicle. For example, the boundary layer from 0.1 of the body length to the 0.8 of the body length has boundary layer less than 0.05 DS. The boundary layer thickness increases dramatically at the tail region of the vehicle due to a convergence of flow. For example, a ring of fluid that surrounds the body of vehicle is sheeting off near the tail region. In some embodiments, the rotor of the vehicle can ride on the tailwind of the fluid coming off the vehicle body. In other words, the rotor can repurpose the turbulence at the tail region to derive force. The size and shape of the rotor can be determined to use the tail wind from the ring of fluid to propel the vehicle. This can reduce the overall drag of the vehicle by at least 25%. In some embodiments, the area of the rotor can be less than 10% (e.g., less than 5%) the largest diameter of the vehicle body to extract power from the tailwind.

The vehicle may include a rotor coupled to a motor-generator. The rotor may include a propeller that is surrounded by a shroud. In some embodiments, the rotor may include a plurality of propellers. Each of the propellers can be surrounded by a shroud. The motor-generator can be coupled to the rotor and can be disposed within the vehicle body. In some embodiments, the motor generator is a two-quadrant motor-generator. The two-quadrant motor-generator is configured to provide a motoring mode (quadrant 1) and a generating mode (quadrant 2). In some embodiments, in motor mode (quadrant 1), the motor-generator acts as a motor when its propeller experiences torque from the water in the opposite direction as it is rotating. In this case, the motor-generator is converting electrical energy into mechanical energy. In some embodiments, in generation mode (quadrant 2), the motor-generator acts as a generator when its propeller experiences torque from the water in the same direction as it is rotating. In this case, the motor-generator is converting mechanical energy into electrical energy. The vehicle may include a rechargeable battery coupled to the motor-generator. The rechargeable battery can provide electrical power to the rotor in motor mode and can receive electrical power from the rotor in generation mode.

In some embodiments, the rotor is coupled to a motor-generator. For example, the rotor can be coupled to the motor-generator via a drive shaft. The motor-generator can be controlled by a controller. The controller can operate in two quadrants. In the first quadrant, the motor-generator provides clockwise drive force to the propellers of the rotor as they rotate clockwise. In the first quadrant, the rechargeable battery provides electrical energy to the motor-generator, and the motor-generator converts this energy into mechanical energy applied to the water. In the second quadrant, the motor-generator provides counter-clockwise torque to the propellers of the rotor as they rotate clockwise. In the second quadrant, the energy flow is from the water to the rotor through the motor-generator and into the rechargeable battery.

Returning to FIG. 1, the method 100 may include submerging the vehicle to a depth in the body of water (120). After the vehicle is provided to the body of water, the vehicle may be submerged in the body of water. In some embodiments, the vehicle can navigate from the surface of the body of water to the ocean floor. The vehicle can plunge or corkscrew to the ocean floor. In some embodiments, a vehicle may be submerged to a first depth. The vehicle can navigate from a surface of the body of water to target depth (e.g., the ocean floor). For example, the vehicle can navigate from the surface of the ocean to the ocean floor. Once deployed, the vehicle may navigate the floor of a body of water (e.g., an ocean) to survey the floor.

The method 100 may include operating the motor-generator of the vehicle in the first quadrant (130). The first quadrant of the motor-generator may be a motor mode. For example, the first quadrant of the motor-generator provides a motor mode for propulsion of the vehicle. In operation, the motor mode provides energy from the rechargeable battery to the motor-generator to propel the vehicle. For example, the electrical energy from the rechargeable battery can be supplied to the motor-generator. The motor-generator converts the electrical energy to mechanical energy to, for example, drive a shaft connected to the propellers of the rotor. The rotor can control the pitch, roll, and yaw of the vehicle body.

The method 100 may include detecting a phase of a wave in the body (140). The phase detection system can estimate the position and velocity of the vehicle and the phase of a wave. The phase detection system may include a plurality of pressure taps disposed around the vehicle body. The pressure taps may include a plurality of differential sensors between pairs of pressure taps to measure the pressure differential across different regions of the vehicle body. A processor can process the information from the phase detection system to detect a phase of a wave motion. For example, the phase of the wave can correspond to the crest, backside, trough, or face of the wave. In some embodiments, the vehicle may include an underwater navigation system using inertial sensors, depth gauge, azimuth, speedometer, or GPS signal as an auxiliary navigation sensor.

The method 100 may include orienting the vehicle to lag the phase of the wave based on the detected phase of the wave (150). In some embodiments, the orientation of the vehicle refers to a six-degree of freedom pose of the vehicle including a pitch, roll, and yaw of the vehicle. The vehicle may be oriented to provide a specific pose and/or position of the vehicle. In some embodiments, the vehicle can be oriented orthogonal to the phase of the wave. For example, the vehicle can be oriented to lag the phase of the wave and the vehicle can be tilted tangential to an orbit of the wave motion. In some embodiments, the vehicle may lag the phase of wave by at least 60° (e.g., from 60° to 120°, from 70° to 110°, from 75° to 105°, from 80° to 110°, from 85° to 100°, or from 90° to 100°). For example, orienting the vehicle may including lagging the phase of wave by about 90°. The method may include iteratively adjusting the orientation of the vehicle based on the detected phase of the wave. The phase detection system can continuously detect the phase of the wave motion. The processor can process the information from the phase detection system to iteratively adjust the orientation of the vehicle. In one example, the wave motion may be irregular causing the motion of the wave to vary. In this example, the phase detection system can continuously detect the phase of the wave motion to adjust the orientation of the vehicle.

The method 100 may include synchronizing an inertial acceleration of the vehicle to movement of the wave (160). After the phase of the wave is detected and the vehicle is oriented to lag the phase of the wave, the inertial acceleration of the vehicle can be synchronized with the movement of the wave. The motor-generator can supply thrust to the rotor to synchronize the movement of the vehicle to the movement of the wave. In some embodiments, synchronizing the movement of the vehicle may include adjusting the velocity and direction of travel of the vehicle based on the detected movement of the waves. For example, synchronizing the inertial acceleration of the vehicle to movement of the wave may include accelerating the vehicle in a direction perpendicular to the wave particle orbit. The motor-generator can provide an initial thrust to synchronize movement of the vehicle with the movement of the wave particle orbit. The movement of the wave in the wave particle orbit provides a tangential lift to the vehicle that is greater than a drag of the vehicle. The remainder of the tangential lift may be used to extract energy from the wave motion.

The vehicle can travel in a loop trajectory relative to the movement of the wave particle orbit. In the loop trajectory, the acceleration of the vehicle is in the vertical axis when taken from the vehicle body. In some embodiments, the motion of the wave is in the sagittal plane of the vehicle. The vehicle can begin inertial acceleration in the loop trajectory at an initial position and can complete the loop trajectory at a final position. In some embodiments, the initial position and the final position are substantially the same position. The movement of the wave forces the vehicle from the initial position to the final position after the inertial acceleration of the vehicle is synched with the wave motion.

The method 100 may include switching the motor-generator to the second quadrant for generation mode to convert energy from the movement of the wave to electrical energy (170). The generator converts wave motion energy into electrical energy to charge the onboard rechargeable battery of the vehicle. For example, the vehicle includes a motor-generator that provides a first quadrant for motor mode and a second quadrant for generation mode. As a motor, the motor-generator consumes electricity (e.g., flows in from the rechargeable battery) to make mechanical power, and as a generator, the motor-generator consumes mechanical power (e.g., wave motion) to produce electricity (flows out). In motor mode, the propellers of the rotor may exert torque in a first direction to provide thrust for the propellers from the motor-generator. In generation mode, the propellers of the rotor may exert torque in a second direction to extract mechanical energy from the wave. In some embodiments, after the inertial acceleration of the vehicle is synchronized with the movement of the wave, the motor-generator is switched to the second quadrant for generation mode. In generation mode, the propellers of the rotor exert torque in the second direction to use wave energy to propel the vehicle and simultaneously extract power from the wave. The method 100 may include storing the energy from the wave in the rechargeable battery (180).

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Finally, although the steps of the method of FIG. 1 are listed as distinct steps, the disclosure contemplates that any of the steps may be performed in combination (e.g., simultaneously and concurrently).

Figure 2A:
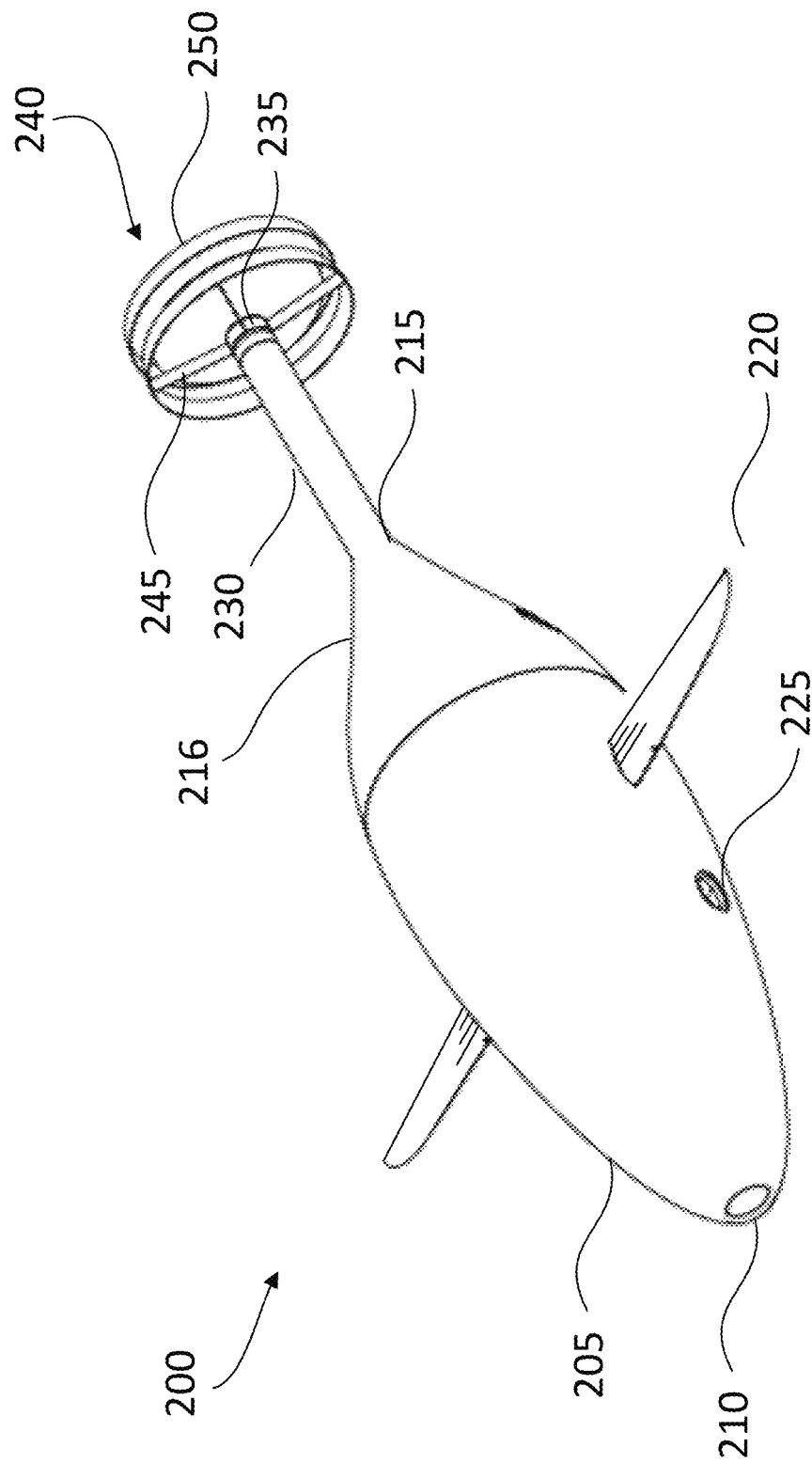
Figure 2B:
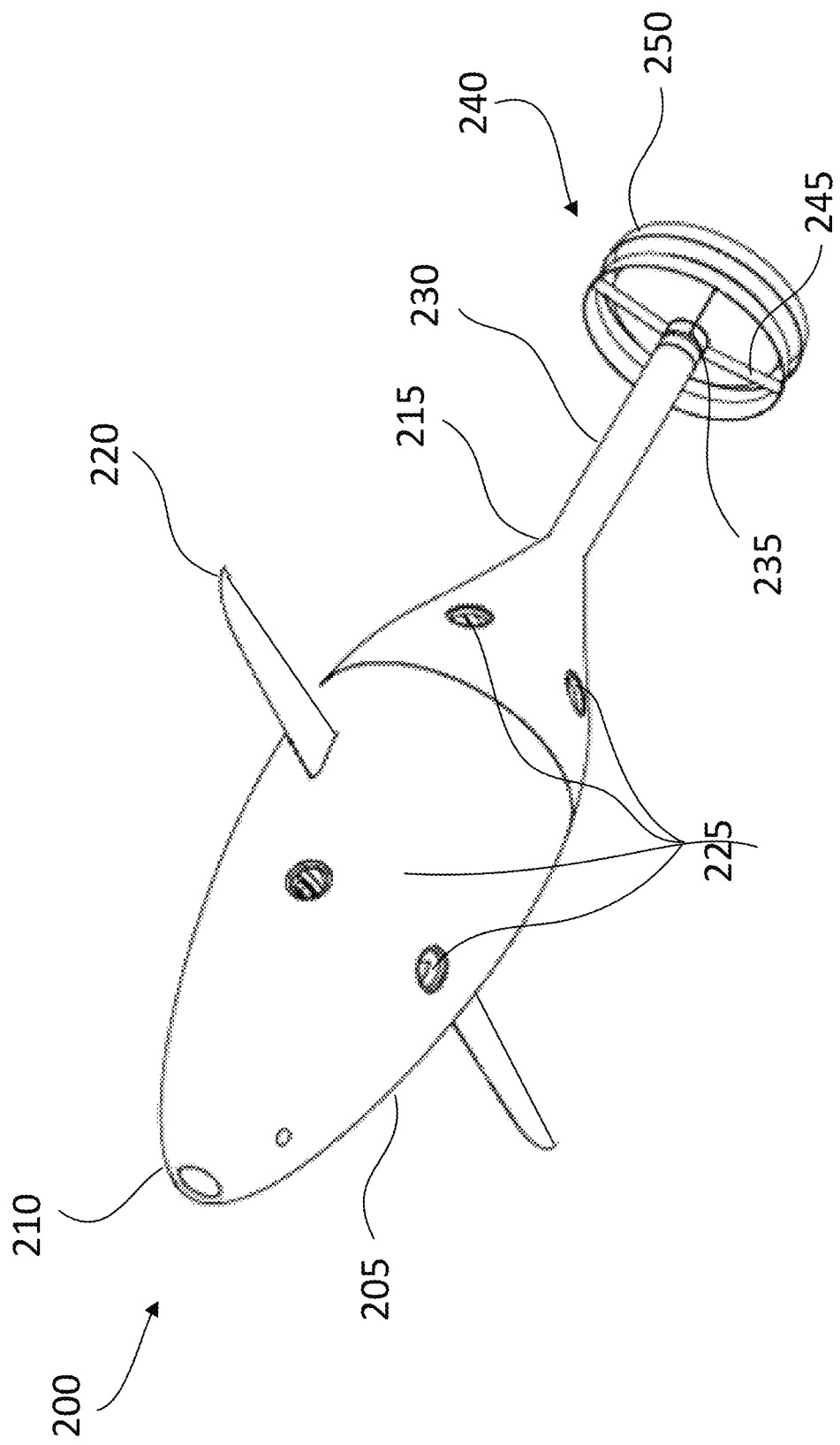

FIGS. 2A and 2B show top and bottom perspective views of a vehicle, respectively, according to some embodiments of the present disclosure. The vehicle 200 may include a vehicle body 205 have a main body extending from a nose region 210 to a tail region 215. The vehicle body 205 may be a hollow body having an overall shape that is spherical, spheroid, elliptical, or cylindrical. In some embodiments, the vehicle body 205 may have an overall shape that is a substantially elliptical geometry. This vehicle body 205 may include a portion of the body that has no gradient (e.g., zero gradient) followed by a controlled gradient to a tail region 215 that terminates at a pressure recovery ramp. The vehicle body 205 may include two or more wings 220 disposed on the vehicle body. The shape of the vehicle body 205 provides extensive natural flow to achieve drag levels lower than common vehicle body designs for underwater vehicles that do not include any lifting applications (e.g., submarines, AUVs, blimps, etc.). Without being bound by theory, it is postulated that there is a limited region of size and speed in fluid flow where the boundary layer about a vehicle body can exist in either a substantially laminar or a turbulent state. In this region, the base body drag of an extensively laminar body can be less than ⅓ of the base body drag of a fully turbulent body of equal volume and speed. The shape and geometry of the vehicle 200 body provides an extensively laminar body that reduces drag.

The vehicle body 205 design can achieve extensive natural laminar flow with drag levels lower than common underwater bodies comprising only non-lifting applications (e.g., submarines, AUVs, blimps, secondarily specific aircraft). For example, the vehicle body 205 may have a shape that can exist in a laminar boundary layer that substantially reduces the flow drag. This is governed by a balance between laminar bubble separation management at lower Reynolds numbers and increasingly aggressive shape-based favorable pressure gradient stabilization across extended forward region with increasing Reynolds numbers. The speed and power levels enable means of providing sufficient propulsive energy to a vehicle that utilizes multiple ambient energy sources to power and energize the vehicle craft.

In abundant fluid volumes (e.g., the oceans and atmosphere of the earth), high frequency micro vorticities and turbulence quickly decay into heat, leaving an inherently calm fluid state at a micro scale. The bulk of both the oceans and the atmosphere contain low turbulence capable of sustaining extensive laminar flows. Such fluid is suitable for an initial laminar boundary layer state at the leading edges of a vehicle body as the fluid first encounters the fluid portion that is found to be in close contact of the surface of the vehicle body. Fluid viscosity at this interaction can quickly give rise to a turbulent boundary layer state. The initial contact of a surface starts with the potential of the boundary layer interface to be laminar, but the subsequent surface interaction can irreversibly change the boundary layer to a turbulent state. For example, surface roughness, waviness, vibration, pressure gradient by the surrounding flow field and body shape, or flow divergence/convergence can all cause the boundary layer to transition to a turbulent state.

The vehicle body 205 may include a nose region 210 at a distal end of the vehicle body. The nose region 210 may be rounded. For example, the vehicle body 205 may have a curvature that transitions to rounded portion at the nose region 210. The fluid viscosity at the nose region 210 (e.g., the contact surface) can dissipates from an initial turbulent boundary layer state to a laminar boundary layer state around the vehicle body 205. FIG. 2C shows a front view of the vehicle 200 including the nose region 210. The nose region 210 may include a nose opening 212. The nose opening 212 may include a sensor. The sensor may provide low-power measurements of temperature, pressure, depth, and velocity. In some embodiments, the sensor can be a conductivity, temperature, and depth (CTD) sensor. The CTD sensor is capable of sensing salinity of the water, water temperature, and depth. The CTD can provide speed of sound information and a reference depth measurement. It is understood that any sensor providing this information can be substituted in place of the sensor, and that the system can be operated without the CTD sensor. In some embodiments, the nose region 210 may include an inertial navigation system (INS) that includes a Doppler Velocity Log (DVL) and a CTD sensor. FIG. 2C also shows a plurality of pressure taps 225 disposed around vehicle body 205

As shown in FIG. 2B, the vehicle body 205 may include a tail region 215. The tail region 215 is on the opposing end of the vehicle body 205 as the nose region 210. The vehicle body 205 may have a tail region 215 that is cone-shaped. For example, the tail region 215 may be in the shape of a truncated cone. The vehicle body 205 may include a gradient 216 between a portion (e.g., a central portion) of the vehicle body 205 and the tail region 215. The gradient 216 provides a pressure recovery ramp for fully laminar flow. In some embodiments, the gradient 216 leading to the tail region 215 has a slope from 10° to 70° (e.g., from 20° to 65°, from 30° to 60°, from 40° to 60°, from 45° to 60°, or from 50° to 60°).

The vehicle body 205 may include a stem 230 extending from the tail region 215 to a rotor 240. For example, the stem 230 may extend from the tail region 215 to the rotor 240. The stem 230 may have a constant circumference along its entire length. For example, the stem 230 may have a constant circumference from the distal end 232 of the tail region 215 to the rotor 240. In some embodiments, the circumference of the stem 230 can vary along its length. For example, the circumference of the stem 230 may continually decrease from the tail region 215 to the rotor 240. In some embodiments, the stem includes a shaft extending from the motor-generator in the vehicle body 205 to the rotor 240. In some embodiments, the vehicle 200 does not include a stem 230. For example, the vehicle body 205 may include a main body portion having no gradient (e.g., constant width) followed by a gradient 216 to the tail region 215 that terminates at a point. The rotor 240 may be located at the termination point of the tail region 215. In this embodiment, the gradient 216 of the tail region 215 continues to the termination point. In some embodiments, the gradient 216 can vary from the main body portion to the tail region 215. For example, the gradient 216 may comprise a first gradient for a first portion of the gradient and a second gradient (different from the first gradient) for a second portion of the gradient.

FIGS. 2A and 2B show the vehicle body 205 including a rotor 240. The rotor 240 may include a plurality of blades 245. The plurality of blades 245 may be secured to a hub 235. For example, the rotor 240 may include a plurality of blades 245 secured to a hub 235 which can be rotated by a shaft connected to a motor-generator through a transmission. In some embodiments, a shaft (not shown) extends from the motor-generator through the stem 230 and is coupled to the hub 235. The rotor 240 may include a shroud 250 that surrounds the plurality of blades 245. The shroud 250 in combination with the vehicle body 205 of the underwater vehicle forms a nozzle through which flow is accelerated. In some embodiments, the shroud 250 is secured to an outer periphery of the plurality of blades 245 through a plurality of vanes. In some embodiments, the rotor 240 includes an additional hub including an additional set of blades for additional thrust. In this embodiment, a second hub may be located within the shroud 250 or the rotor may include a second shroud corresponding for the additional hub including an additional set of blades.

FIGS. 2D and 2E show an overhead view and a side view of the vehicle 200. Each of FIGS. 2D and 2E show a profile of the vehicle body 205 shape. The vehicle body 205 has a shape of a flattened elliptical body including a nose region 210 that is rounded and a gradient 216 to a tail region 215. The vehicle body 205 may include two or more wings 220 disposed on the vehicle body. In some embodiments, vehicle body 205 may include two wings 220 disposed on opposing sides of the vehicle body. The wings 220 are utilized for the purpose of lift and to control forces acting on the vehicle body 205. In the ranges of useful lift, the lower bound of drag of wings is strongly limited by induced drag. The induced drag is associated with the inherent deflection and momentum introduced into the flow field by lift/circulation of a wing section. Even if the wing profile had zero drag itself (e.g., no section skin friction or pressure drag), the induced drag of wings and wing bodies compared to their volume is multiples of the ratio of drag and useful volume of the bodies. For a given mass or volume and typical speeds of interest, the ideal wing size is typically much too small to contain the mass/volume it can support. Therefore, a non-lifting containment body coupled with an appropriate ideal wing has the potential for superior performance (volume/drag or weight/drag).

In some embodiments, the vehicle 200 may include first wing and a second wing mounted on the vehicle body 205. The size and shape of wings provides lift for vehicle. For example, the size and angle rotation of the wings are in balance with the volume of the vehicle body to provide tangential lift for the vehicle. As the vehicle moves in a loop trajectory tracking the wave motion at a phase lag from the wave, the resultant wave particle motion is radially inward at all points in the path, allowing the vehicle to continually experience a tangential lift component moving it forward, while using its own displaced volume as a reaction mass, to be accelerated radially inward by the radial component of the lift. This tangential lift component is determined by the body drag, wing profile drag, lift induced drag of the wing, and the shroud drag. Any remaining forward tangential force may drive the rotor, to generate electricity using the motor-generator.

In some embodiments, the two or more wings of the vehicle provide a lift to drag ratio that provides tangential lift for the vehicle to extract energy from the wave motion. For example, the two or more wings of the vehicle may have a lift to drag ratio greater than 14:1 (e.g., from 14:1 to 40:1), e.g., greater than 15:1, greater than 20:1, greater than 25:1, greater than 30:1, greater than 35:1, or greater than 38:1. In some embodiments, the two or more wings of the vehicle provide a lift to drag ratio of about 30:1.

In some embodiments, the volume of the vehicle is balanced with the area of the wings to provide tangential lift for the vehicle to extract energy from the wave motion. In some embodiments, the ratio of the volume of the vehicle body, raised to the two-thirds power ($V^{2/3}$), to the total surface area of the two or more wings may range from 2:1 to 10:1. For example, a ratio of a volume of the vehicle body, raised to the two-thirds power ($V^{2/3}$), to a total surface area of the two or more wings may range from 2.1:1 to 9:1, 2.2:1 to 8:1, 2.3:1 to 7:1, 2.5:1 to 6:1, 3:1 to 5:1, or any ratio in between these ranges. In some embodiments, the length of the vehicle may range from 2 meters to 3 meters (e.g., 2.5 meters to 3 meters).

Figure 2F:
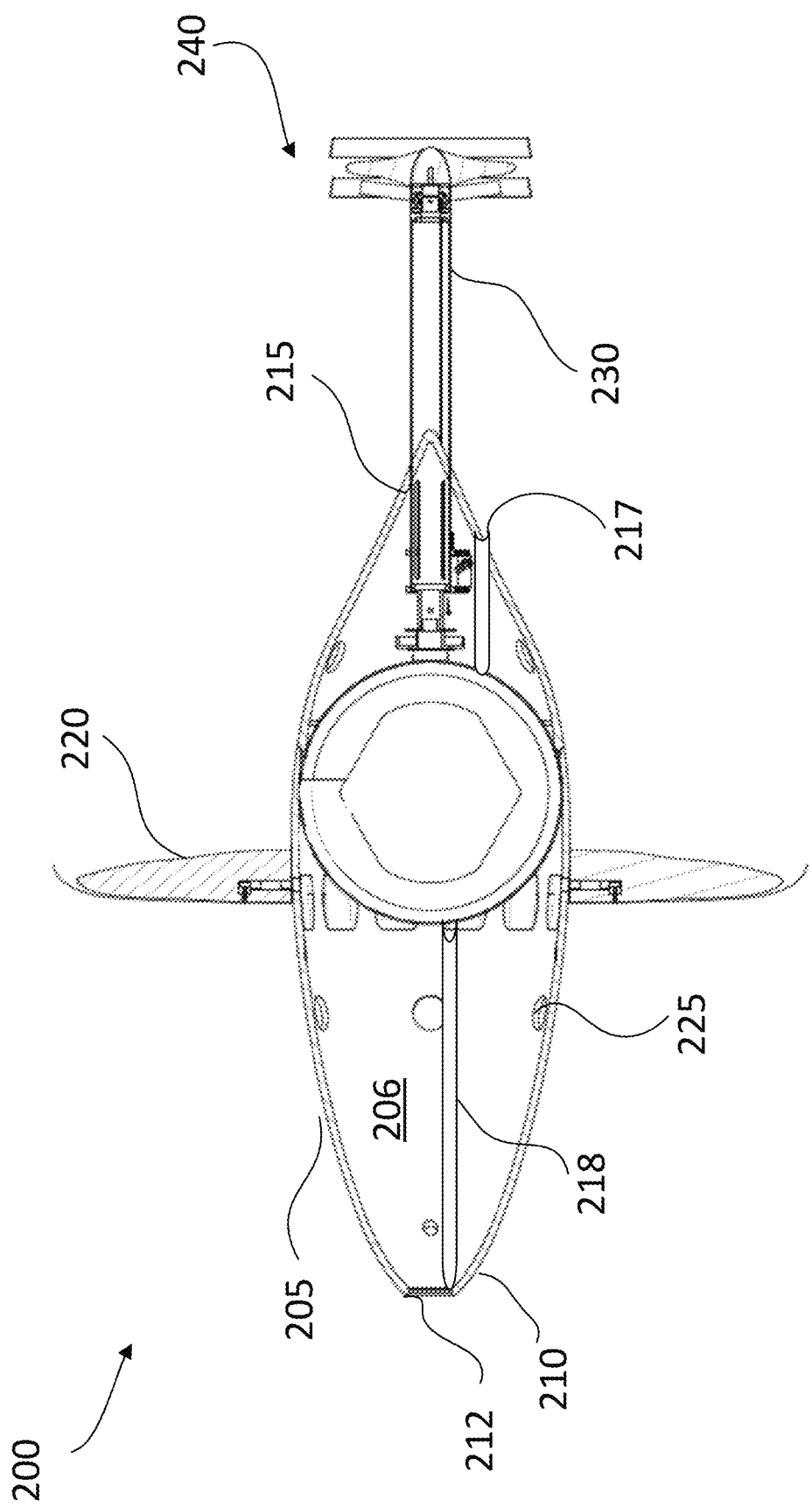
Figure 2G:
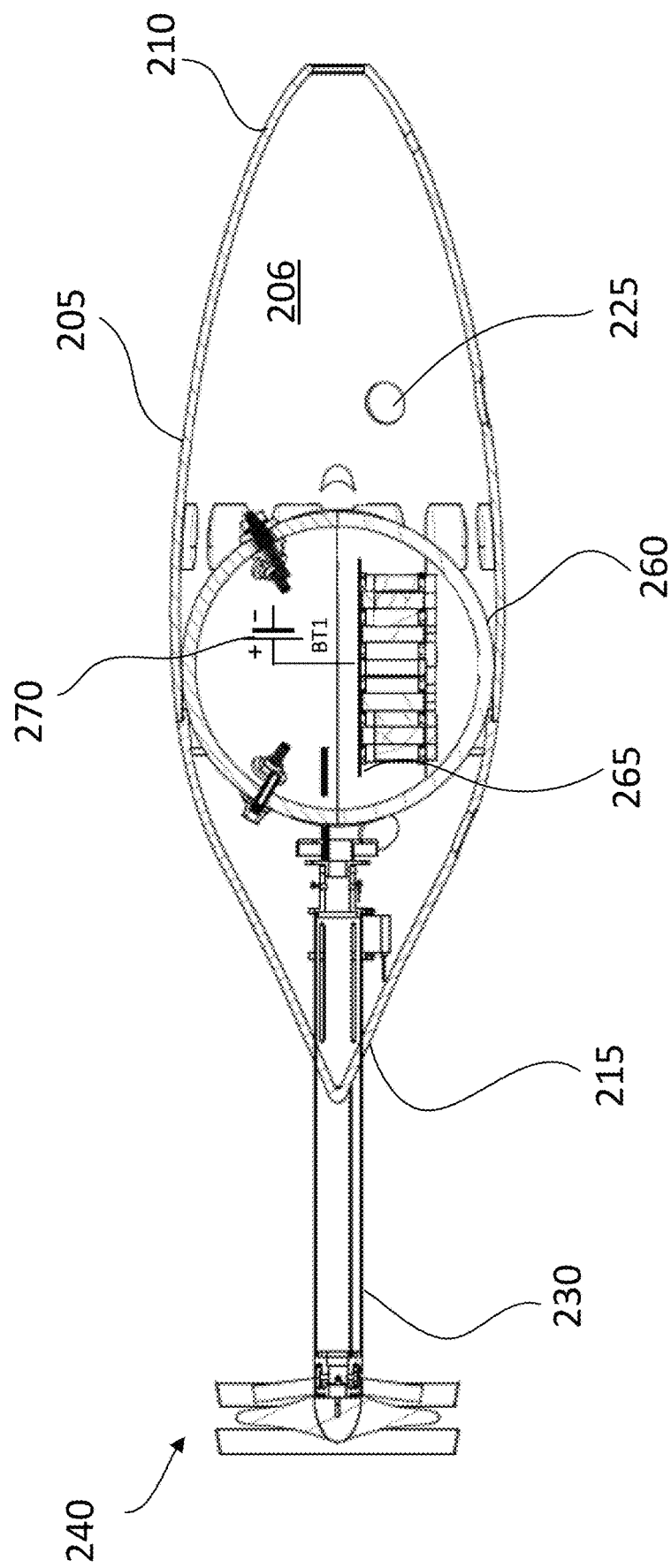

FIG. 2F shows an overhead cross-sectional view of the vehicle and FIG. 2G shows a side cross-sectional view of the vehicle according to some embodiments of the present disclosure. The vehicle body 205 includes an interior volume 206 for housing components of the vehicle. The vehicle body 205 may include a phase detection system including a plurality of pressure taps 225 disposed around the vehicle body. The vehicle 200 uses a plurality of pressure taps 225 to compute an estimate of its position with respect to wave movement. The vehicle can include a phase detection system that can simultaneously detect pressure differential in all directions about the vehicle. The vehicle may include a processor in communication with the pressure taps 225. The processor can determine the current rate of acceleration and changes in rotational attributes, including pitch, roll and yaw, based on data from the phase detection system. For example, the data from the pressure taps 225 is provided to the processor, which uses the data to calculate the current position of the vehicle and the phase of the wave. The phase detection system uses the pressure taps to detect pressure at discrete regions along the vehicle body and to measure pressure differential across specific regions of the vehicle body to deduce the phase of the wave. The processor processes information from the phase detection system to detect a phase of a wave motion.

In some embodiments, fluid may enter the vehicle 200 at the nose region 210 through the nose opening 212. The nose opening 212 may include a plurality of sensors to detect different properties of the fluid. In some embodiments, fluid flow may enter the vehicle at the nose region 210 through the nose opening 212. As shown in FIG. 2F, the vehicle 200 may include a fluid sampling pipe 218 extending from the nose opening 212 to an exit port 217 adjacent the tail region 215 of the vehicle body. In some embodiments, vehicle body 205 includes a plurality of exits ports adjacent the tail region 215. The flow of water that enters through the nose opening 212 can be under pressure in the fluid sampling pipe 218, losing momentum as it flow, resulting in a low kinetic energy flow through the fluid sampling pipe 218. The velocity of the flow of water is substantially decreased, thereby considerably lowering the drag of the water. Due to pressurization in the fluid sampling pipe 218, the flow of water can be reaccelerated out of the exit port 217. This can recover the momentum of the flow of water to propel the vehicle. The fluid sampling pipe 218 avoids the use of external fluid sampling devices that can add considerable drag to the vehicle. Additionally, sensors can be positioned at the tip of the nose opening 212 or in the fluid sampling pipe 218 to sample a "virgin" flow of water, unaffected by prior interactions with any portion of the vehicle. The low kinetic energy flow of water through the nose opening 212 to the exit port 217 provides an internal flow of fluid that can be concurrently, e.g., simultaneously, used to sample the flow of water and recover energy from the fluid flow to propel the vehicle.

As shown in FIG. 2G, the interior volume of the volume may include an enclosure 260. The enclosure 260 may be pressurized enclosure that can withstand forces at great depths. The enclosure 260 may include a motor-generator 265 in communication with a rechargeable battery 270. In some embodiments, the motor-generator 265 comprises a two-quadrant motor-generator. The rechargeable battery 270 can provide electrical power or store electrical power depending on the mode of the motor-generator. The two-quadrant motor-generator is configured to provide a motoring mode (quadrant 1) and a generating mode (quadrant 2). For example, the motor-generator 265 may include a first quadrant for motor mode and a second quadrant for generation mode. In some embodiments, the rotor acts as a generator when its propeller continues to rotate one direction while it experiences torque from the surrounding water in the same direction. In some embodiments, the motor-generator is a four-quadrant motor-generator.

Figure 12:
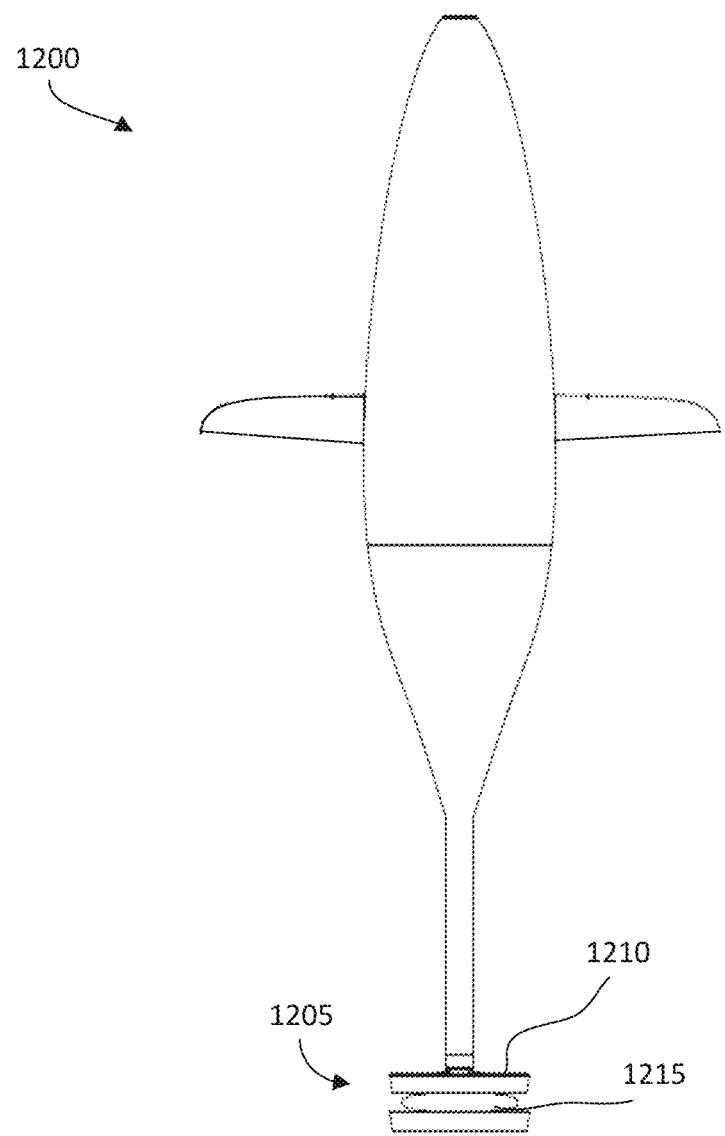
FIG. 12 illustrates a vehicle body design including an articulating rotor according to some embodiments.

In some embodiments, the vehicle body can include alternative designs. For example, FIGS. 12-15 show four alternative designs for the vehicle body. FIG. 12 shows a vehicle 1200 including an articulating rotor 1205 described herein. As discussed herein, the rotor may comprise one or more rotor blades 1215 that can be surrounded by a shroud 1210. The rotor can articulate to change the direction or position of the vehicle 1200.

Figure 13:
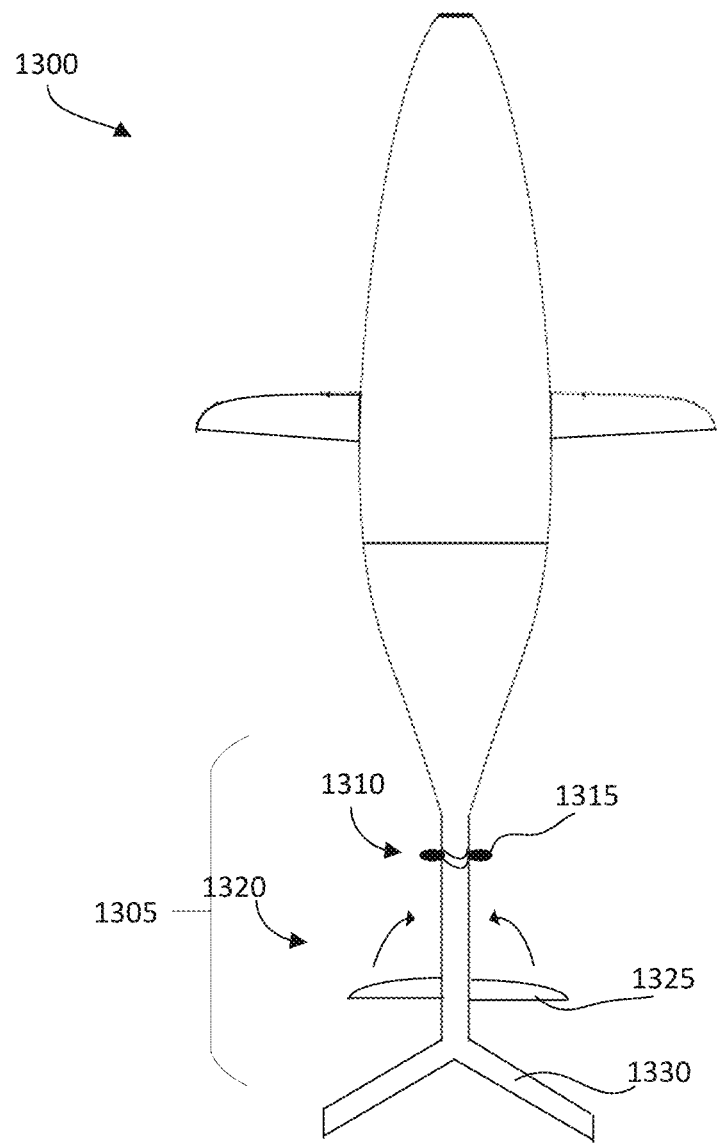
FIG. 13 illustrates a vehicle body design including two rotor systems according to some embodiments.

FIG. 13 shows a vehicle 1300 comprising a tail region 1305 including a first rotor 1310 and a second rotor 1320. In this embodiment, the vehicle 1300 includes two separate rotor systems for motor generation (e.g., using energy from the rechargeable battery to provide thrust) and wave power generation (e.g., deriving energy from the wave to provide energy to the rechargeable battery). For example, the first rotor 1310 may be adjacent a first end of the tail region 1305. The first rotor 1310 may include fixed angle rotor blades 1315 for motor generation. The second rotor 1320 may be downstream the first rotor 1310. The second rotor 1320 may comprise collapsible rotor blades 1325 for wave generation. The second rotor 1320 may retract the rotor blades 1325 during motor generation mode and may deploy the rotor blades 1325 in wave power generation mode. The vehicle 1300 may also include a fin 1330 at a second end of the tail region 1305. The fin 1330 can be shaped like a whale fin. In some embodiments, the fin tips are fixed in angular direction.

Figure 14:
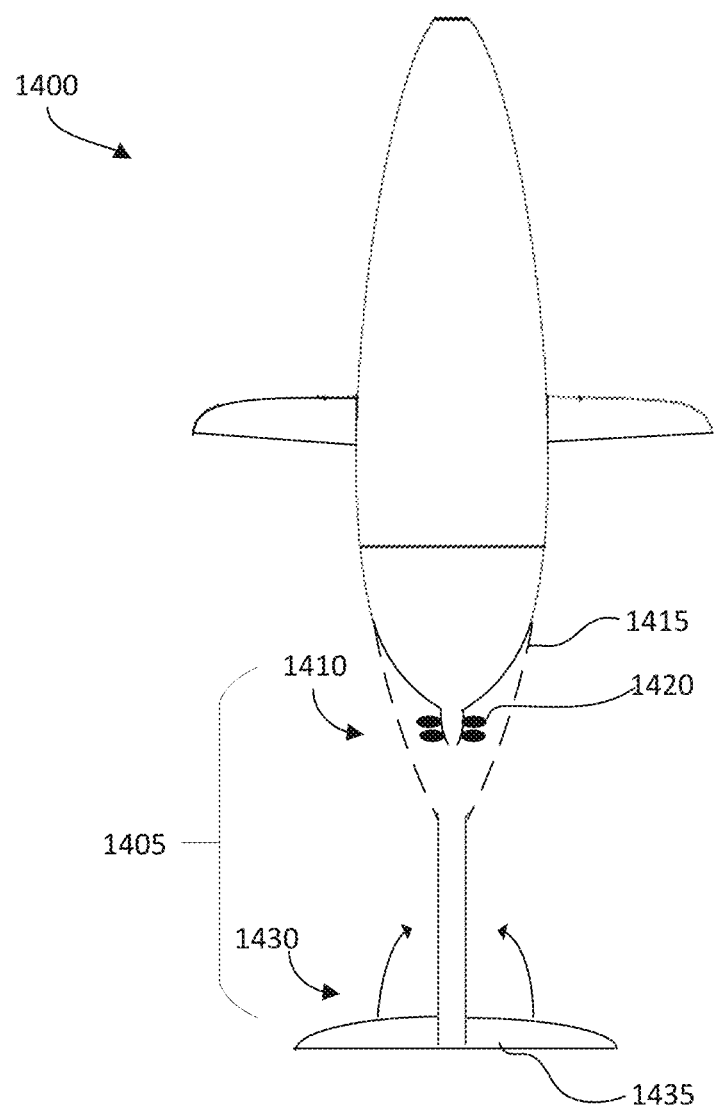
FIG. 14 illustrates a vehicle body design including two rotor systems according to another embodiment.

FIG. 14 shows another embodiment of the vehicle 1400. In this embodiment, the vehicle 1400 may include a screen 1415 adjacent the first rotor system 1410. The screen 1415 allows the boundary layer flow to be captured by the first rotor system 1410 to provide propulsion and reduce drag. For example, the vehicle may include an internal axial pump that draws water through screen 1415, which can be annular in shape. This can draw in the boundary layer and capture the momentum from the boundary layer to reduce drag and propel the vehicle. In this embodiment, the first rotor system 1410 can ingest the boundary layer that accelerates out of the nozzle 1420. In some embodiments, the nozzle 1420 can be steerable. This embodiment includes a second rotor 1430 at end of the tail region 1405. The second rotor 1430 may comprise collapsible rotor blades 1435.

Figure 15:
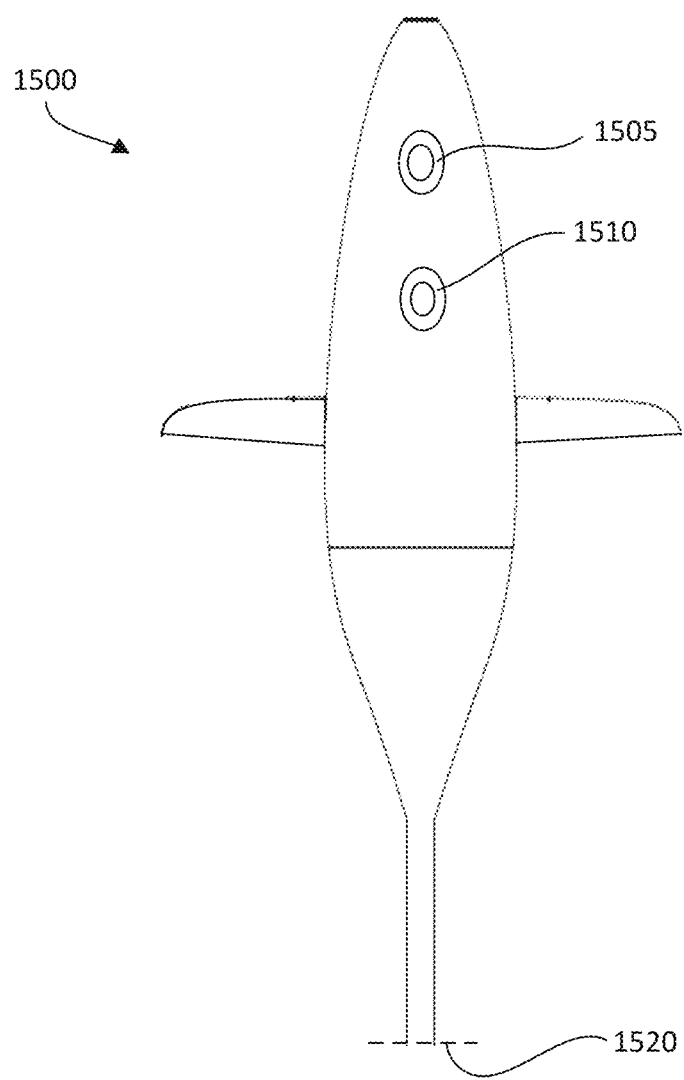
FIG. 15 illustrates a vehicle body design including controlled moment gyroscopes according to another embodiment.

FIG. 15 shows another embodiment of the vehicle 1500. In this embodiment, the vehicle 1500 may include one or more control moment gyroscopes 1505, 1510. A control moment gyroscope is an attitude control device. The control moment gyroscopes 1505, 1510 may include a spinning rotor and one or more motorized gimbals that tilt the rotor's angular momentum. As the rotor tilts, the changing angular momentum causes a gyroscopic torque that rotates the vehicle body. In some embodiments, the vehicle may include a dual-gimbal control moment gyroscope. In some embodiments, the control moment gyroscope is disposed inside a sphere and can be used as an internal adjustment mechanism. This embodiment can be combined with a fixed wake, thruster, or internal pump as described in the previous embodiments.

Figure 3:
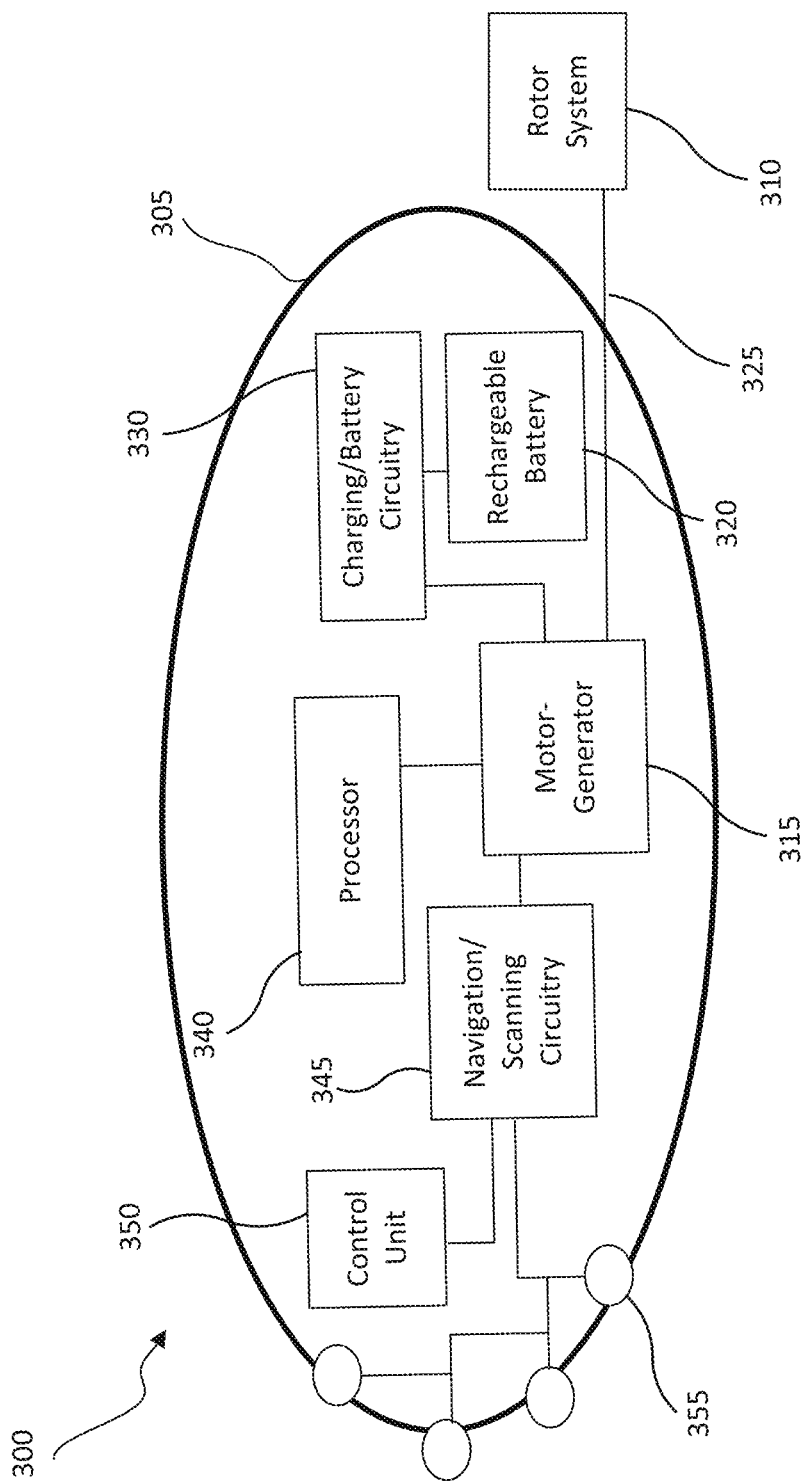
FIG. 3 illustrates a simplified schematic of the internal components of an underwater vehicle harnessing wave energy according to some embodiments.

FIG. 3 illustrates a simplified schematic of the internal components on an underwater vehicle according to some embodiments. In some embodiments, the vehicle 300 comprises a rotor 310 that is externally located from the vehicle body 305. The rotor 310 may be coupled to a motor-generator 315 via a drive shaft 325. The motor-generator 315 is configured to actuate the drive shaft 325 to supply thrust to the rotor 310. In some embodiments, the motor-generator 315 is configured to provide a motor mode and a generation mode. In the motor mode, the motor-generator 315 receives electrical energy from the rechargeable battery 320 via the charging/battery circuitry 330 to provide energy to the rotor 310. In the generation mode, the motor-generator 315 is actuated in an opposite direction to convert mechanical energy received from the rotor 310 to electrical energy that is used to charge the rechargeable battery 320 via the charging/battery circuitry 330.

In some embodiments, the rotor 310 comprises one or more propellers. The propellers may be mounted on the vehicle body 305 at different angles to adjust the output of the rotor 310 to control a pitch, a roll, and/or a yaw of the vehicle 300. In some embodiments, the rotor 310 may adjusted by the processor 340 to control the pitch, roll, and yaw of the vehicle 300. For example, the processor 340 may be in communication with an pressure taps 355, which is configured to detect the current rate of acceleration and changes in rotational attributes, including pitch, roll and yaw. This data is then provided to the processor 340, which can use the data to calculate the current position of the vehicle among other items of interest.

The rechargeable battery 320 may be the main power source for driving the motor-generator 315 in motor mode. The charging/battery circuitry 330 may be provided to store wave energy derived from the motor-generator 315 and to convert the mechanical energy into electrical energy for the rechargeable battery 320. In some embodiments, a high voltage converter may be provided to convert the voltage and current level utilized in the distribution to the motor-generator 315.

In some embodiments, the vehicle 300 is provided with a control unit 350 for controlling the navigation in the water during operation. In some embodiments, the vehicle 300 is operated by a pre-programmed method of navigating a predetermined route according to a pre-inputted program using navigation and scanning circuitry 345. In some embodiments, the control unit 350 of the vehicle 300 has a depth sensor for measuring depth from the sea level and an altitude measuring sonometer for measuring altitude from the sea bottom. The control unit 350 maintains depth and altitude within an error range to maintain the course. Thus, in some embodiments, the vehicle 300 has all the information related to the operation and control of the vehicle, such as the depth and speed, posture, and the output of the motor-generator 315, and the processor 340. This information is processed and stored in an on-board memory of the vehicle 300. In some embodiments, the control unit 350 is configured to control the roll, pitch, and/or yaw of the vehicle 300. For example, based on information from the phase detection system include the plurality of taps 355 and the processor 340, the control unit 350 can adjust the motor-generator 315 to maintain or adjust the roll, pitch, and/or yaw of the vehicle 300.

In some embodiments, the vehicle 300 employs a sonar device to survey a target area. In some embodiments, the sonar device is a side scan sonar array. The side scan sonar can emit an acoustic signal or pulse of sound into the water. If an object is in the path of the sound pulse, the sound bounces off the object and returns an echo to the sonar transducer. The transducer can measure the strength of the signal. By determining the time between the emission of the sound pulse and its reception, the transducer can determine the range and orientation of the object. This information can be processed using the processor 340 and stored in a system memory. In some embodiments, the vehicles include obstacle avoidance sonars that are installed in a plurality of different positions on the vehicle body, and when a sudden change of terrain or an obstacle appears during navigation, the vehicle 300 can navigate to avoid obstacles and continue back on the predetermined route.

In some embodiments, the vehicle 300 may include auxiliary power sources. For example, the vehicle 300 may include solar panels that convert sunlight into electrical energy. The solar panels can be patches on the vehicle body. In some embodiments, the vehicle may include a retractable solar panel within the vehicle body. The vehicle may extend the solar panels at or near a surface of a body water. The solar panels can be used in conjunction with the methods and systems described herein to generate electrical energy.

Although separate processors and control units are illustrated in FIG. 3, it will evident to one of skill in the art that the processor 340, the navigation and scanning circuitry 345, and the control unit 350 can be implemented as a single processor or multiple processors. One of ordinary skill in the art would recognize many variations, modifications, and alternatives.

Figure 4:
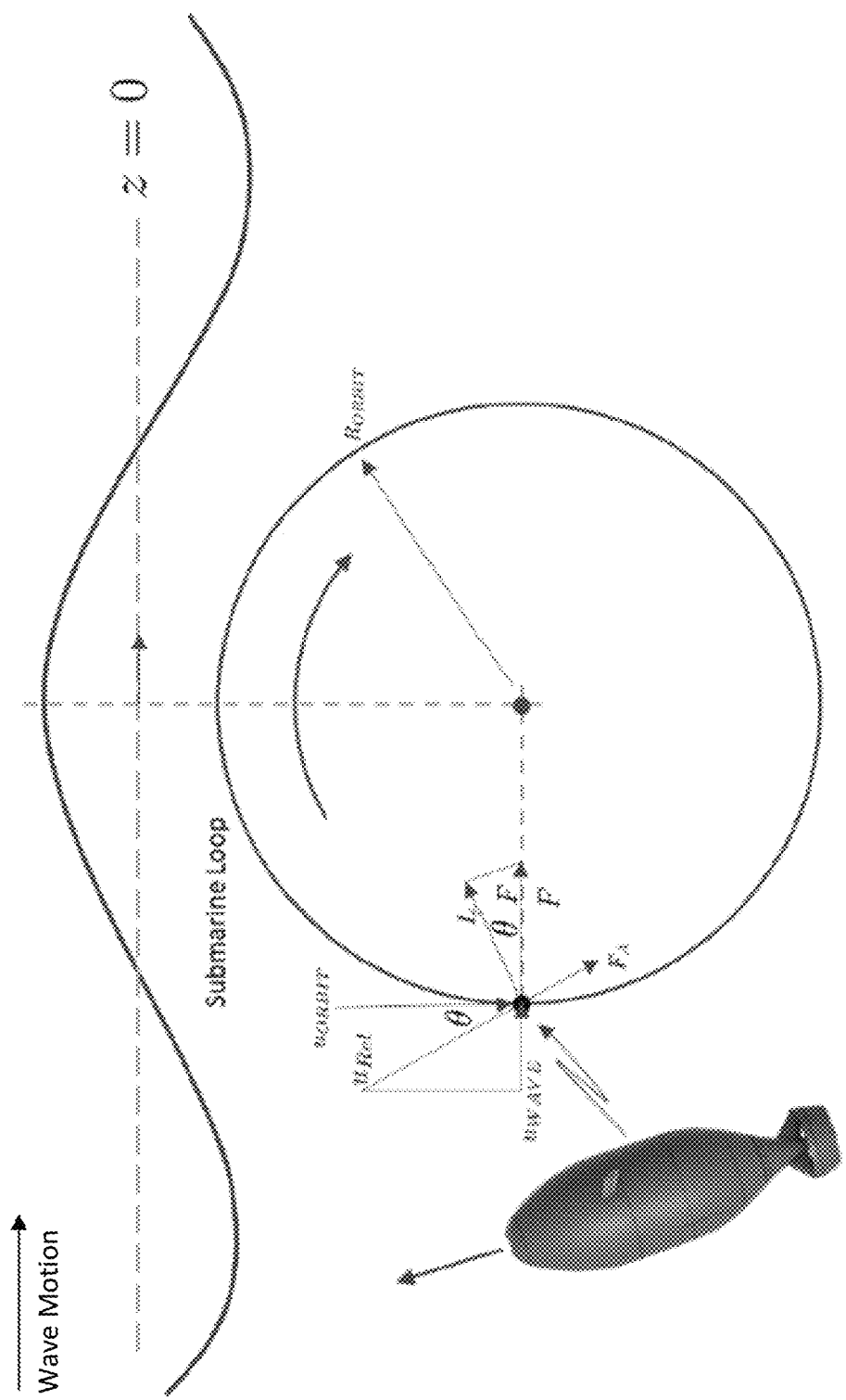
FIG. 4 illustrates a power cycle of vehicle motion related to wave motion according to some embodiments.

FIG. 4 illustrates a flow path of the vehicle with respect to a wave particle orbit according to some embodiments of the present disclosure. In this embodiment, the vehicle may travel in a loop trajectory (e.g., corresponding to the wave particle orbit). For example, in the loop trajectory, the vehicle may continually travel perpendicular to the wave particle orbit. While the wave propagates, the wave particles orbit (e.g., oscillate) around their average position. With the propagating wave motion, the wave particles transfer energy in the wave propagation direction, without having a mean velocity. The diameter of the wave particle orbit reduces with depth below the free surface. Near the surface, the wave particles move in circular orbits equal to the wave height. The orbital motion occurs because waves include both longitudinal (e.g., side to side) and transverse (e.g., up and down) movement, leading to circular motion.

The vehicle may use a phase detection system including plurality of pressure taps and pressure differential sensors to detect a phase of the wave as described herein. Based on the detected phase, the vehicle may orient itself to lag the phase of the wave and control its velocity to be perpendicular to the velocity of the wave particle motion. In some embodiments, the vehicle may lag the phase of wave by at least 60° (e.g., from 60° to 120°, from 70° to 110°, from 75° to 105°, from 80° to 110°, from 85° to 100°, or from 90° to 100°). For example, the vehicle may lag the phase of wave by about 90°.

To extract energy from the movement of waves, the vehicle moves in a loop trajectory perpendicular to the wave particle velocity. As shown in FIG. 4, the $u_{ORBIT}$ is the vehicle velocity corresponding to a given wave particle velocity, $u_{WAVE}$. The vehicle moves in a loop trajectory always perpendicular to the wave particle velocity, $u_{WAVE}$, around the vehicle orbit, $u_{ORBIT}$. The formula for deriving tangential lift force to harness wave energy from wave motion is provided in Equation I below:

$$F_A = D_{Body} + D_{Wing} + D_i + F_{Rotor} + D_{Shroud}, \quad (Eq. 1)$$

wherein $F_A$ is tangential lift force, $D_{Body}$ is the drag of vehicle body, $D_{Wing}$ is the drag of wings, $D_i$ is the lift induced drag, $F_{Rotor}$ is the force of the rotor, and $D_{Shroud}$ is the drag of the shroud around the rotor. The wave particle motion for a given wave is radially inward, $u_{WAVE}$, at all points in the vehicle orbit, $u_{ORBIT}$. This allows the vehicle to continually move with the motion of the wave using tangential lift and using the vehicle's own displaced volume as the reaction mass for the radial component of lift, corresponding to centripetal acceleration. As provided in Equation 1, the tangential lift is offset by the body drag, wing drag, lift drag, and shroud drag. Any remaining forward tangential force can be extracted from the wave by the motor-generator, via $F_{Rotor}$, to provide electrical energy to be stored in the rechargeable battery of the vehicle.

The loop trajectory of the vehicle synchronized with a wave particle orbit harnesses wave energy from the movement of the waves. As described herein, the vehicle detects a phase of the wave and orients the position of the vehicles to initiate a forward path where the vehicle phase and orientation locks on a wave front. The vehicle then synchronizes movement with the wave in an oriented repeating loop while maintaining phase lock (e.g., lift/rotor and/or thrust/heading) such that the particle motion of the waves remains predominantly centripetal to the vehicle's motion and the vehicle can derive power from the wave. The equation for determining centripetal acceleration is:

$$F_c = m * \omega^2 * r_{orbit}, \quad (Eq. 2)$$

wherein $F_c$ is centripetal acceleration, m is the mass of the vehicle, ω is the angular velocity, and r is radius of the orbit. Appendices A and B provide further details regarding system sizing, power optimization, and control schemes for extracting energy from wave motion. Appendices A and B are incorporated by reference in their entireties for all intents and purposes.

In some embodiments, the method for extracting wave energy from an underwater vehicle in a cyclical velocity field (e.g., wave motion) is similar to crosswind kite power. The inertial motion of the vehicle is held perpendicular to the ambient velocity field of the fluid medium, the induced apparent velocity results in a motive lift force along the direction of vehicle motion, and power is extracted from the excess of motive lift force, above and beyond the drag of the vehicle. The main difference is that the flow field is uniform and time invariant for a kite, and the lift force perpendicular to the direction of motion is resolved by a tether to the kite. In the method of harnessing wave energy described herein, the flow field is rotating and cyclical, and the lift force perpendicular to the direction of motion results in acceleration of the vehicle. If the lift coefficient is properly trimmed and the vehicle speed is properly regulated, the direction of travel remains phase-locked to the underlying flow field. The phase locking imposes one additional constraint on the velocity of the vehicle, not present in the case of a kite.

Figures 5A, 5B, 5C, 5D:
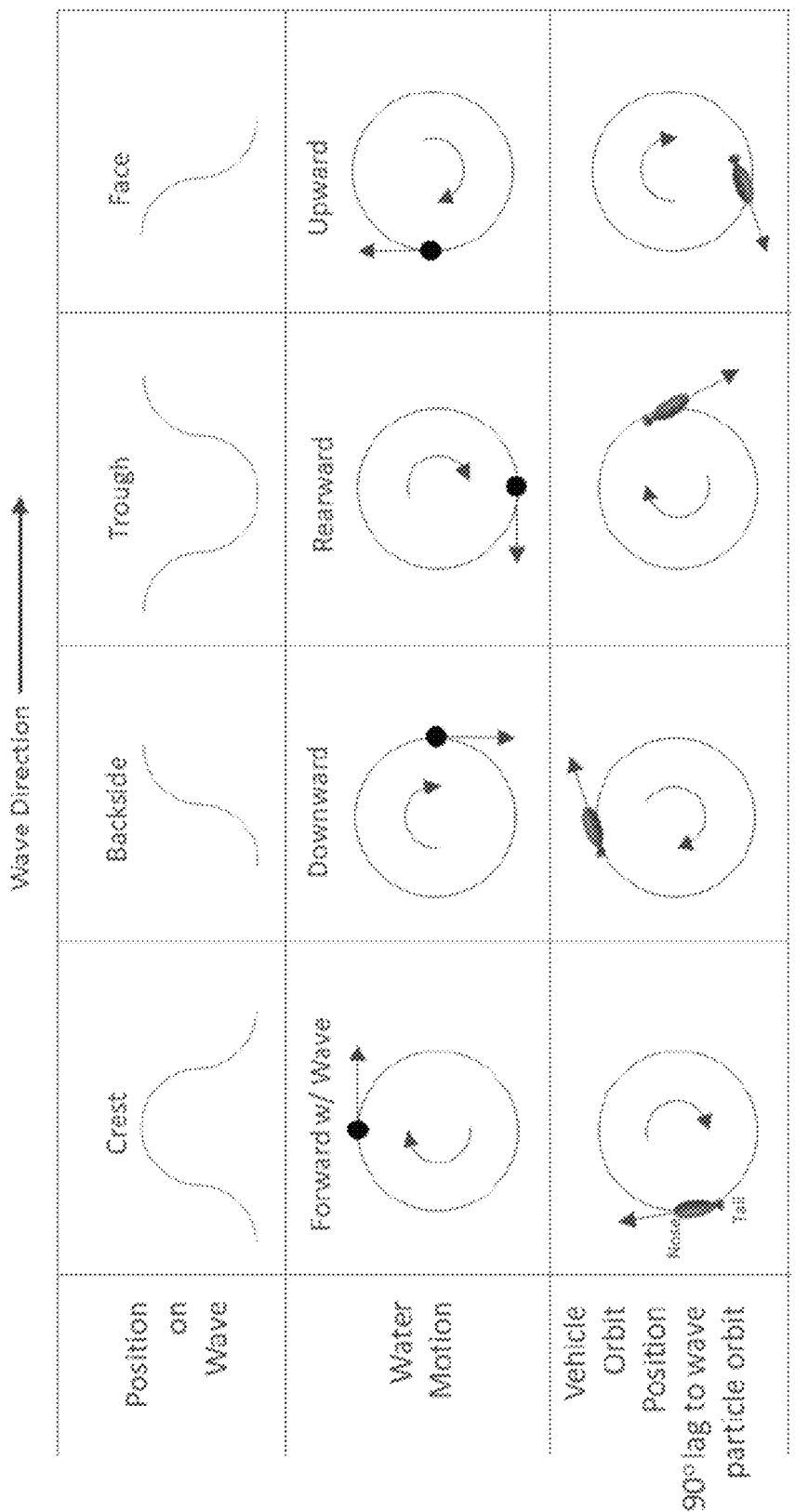
FIGS. 5A-5D illustrate vehicle orientation at different phases of a wave according to some embodiments.

FIGS. 5A-5D illustrate a vehicle loop trajectory corresponding to wave motion according to some embodiments. In this embodiment, the wave is moving from left to right, corresponding to the motion illustrated in FIG. 4. The phase of the wave can be classified as, for example, the crest, the backside, the trough, and the face. For example, FIG. 5A shows the crest of the wave, FIG. 5B shows the backside of the wave, FIG. 5C shows the trough of the wave, and FIG. 5D shows the face of the wave. At each of these phases, the water particle motion is moving radially inward at all positions along its orbit. The orientation and the position of the vehicle is dependent on the phase of the wave. The methods described herein orient and synchronize the movement of the vehicle with the movement of the wave to harness wave energy.

FIG. 5A shows that at the crest of the wave, the wave motion is moving forward with the movement of the wave. In this instance, the vehicle lags the phase of the wave at the crest by 90° and moves in an upward trajectory with the vehicle velocity oriented perpendicular to the orbit velocity of the wave particle. FIG. 5B shows that at the backside of the wave, the wave particle motion is moving downward. In this instance, the vehicle lags the phase of the wave at the backside by 90° and moves in a forward trajectory with the vehicle velocity oriented perpendicular to the orbit velocity of the wave particle. FIG. 5C shows that at the trough of the wave, the wave particle motion is moving rearward. In this instance, the vehicle lags the phase of the wave at the trough by 90° and moves in a downward trajectory with the vehicle velocity oriented perpendicular to the orbit velocity of the wave particle. FIG. 5D shows that at the face of the wave, the wave particle motion is moving upward. In this instance, the vehicle lags the phase of the wave at the face by 90° and moves in a rearward trajectory with the vehicle velocity oriented perpendicular to the orbit velocity of the wave particle. The vehicle can detect the phase of the wave using onboard phase detection system. Based on the sensed phase of the wave, the vehicle is oriented to lag the phase. For example, the vehicle orbit position can lag the wave particle orbit by 90°. After orienting the vehicle, the inertial acceleration of the vehicle may be synchronized with movement of the wave. The vehicle can include a two-quadrant motor-generator that can be switched to a generation mode to derive power from the wave after the acceleration of the vehicle and the wave motion is synchronized.

Figure 6:
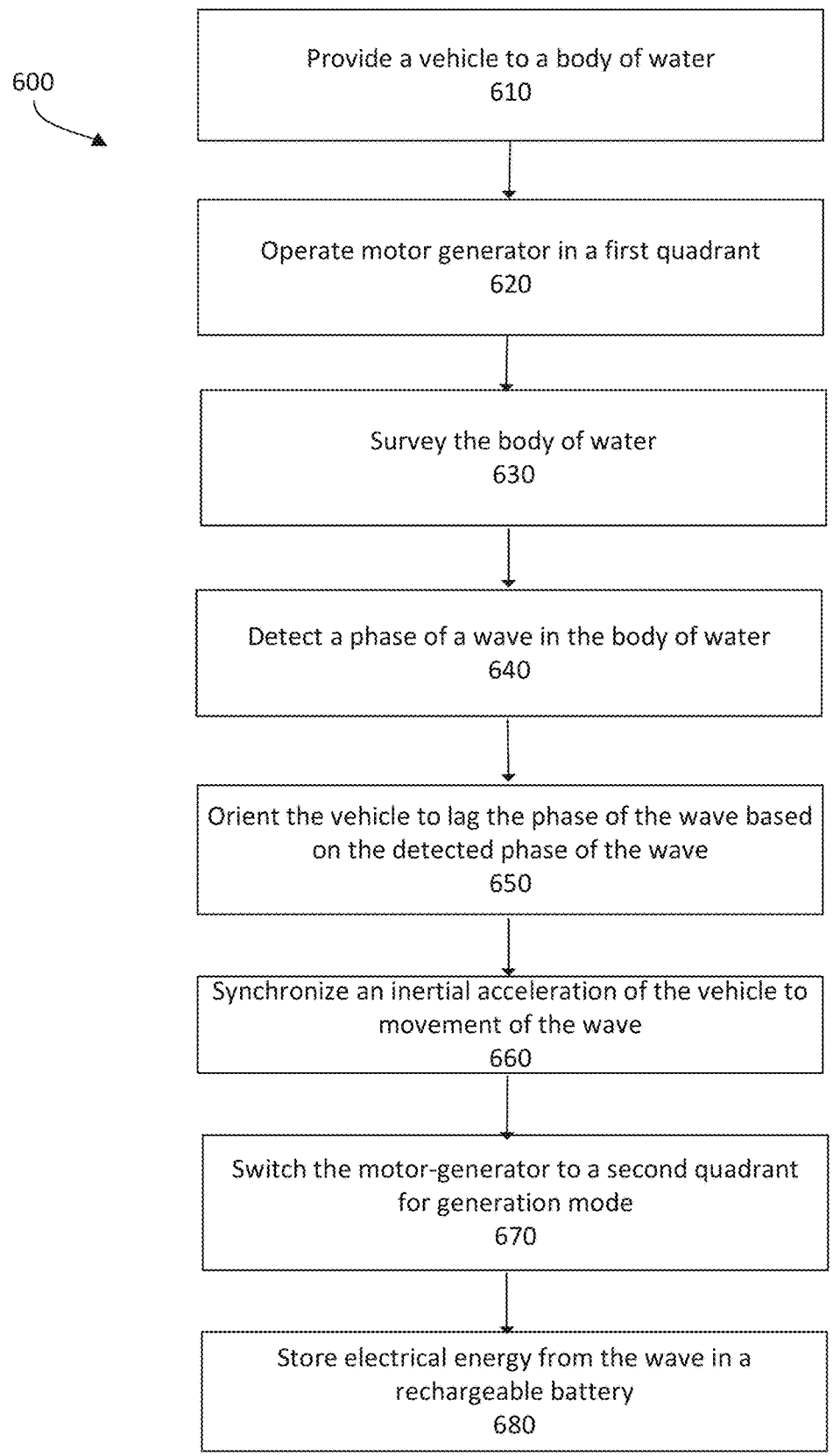
FIG. 6 provides a flow diagram of a method for surveying a body of water according to some embodiments.

FIG. 6 provides a flow diagram of surveying a body of water according to some embodiments of the present disclosure. In some embodiments, a method 600 of surveying a body of water is provided. The method 600 may include providing a vehicle to a body of water (610). In some embodiments, the vehicle may be provided to a surface of body of water. The vehicle may be provided to the body of water in various ways. In some embodiments, the vehicle can be navigated, shipped (e.g., via a boat or submarine), or air-dropped to a target location in the body of water. For example, the vehicle can be circumnavigated from a dock or port to a target location in the body of water.

The vehicle may include a rotor coupled to a motor-generator. In some embodiments, the motor generator comprises a two-quadrant motor-generator. The two-quadrant motor-generator is configured to provide a motoring mode and a generating mode. In some embodiments, the rotor acts as a generator when its propeller experiences torque from the water in the same direction as it is rotating.

The method 600 may include operating the motor-generator of the vehicle in the first quadrant of the two-quadrant operation (620). The first quadrant of the motor-generator may be configured to provide a motor mode for the rotor. For example, the first quadrant of the motor-generator provides a motor mode for propulsion of the vehicle. In operation, the motor mode provides electrical energy from the rechargeable battery to the motor-generator to propel the vehicle via the rotor. The rotor can control the pitch, roll, and yaw of the vehicle body.

The method 600 includes surveying the body of water (630). The vehicle can navigate from a surface of the body of water to target depth (e.g., the seafloor). For example, the vehicle can navigate from the surface of the ocean to the ocean floor. Once deployed, the vehicle may navigate the floor of a body of water (e.g., an ocean) to survey the floor. In some embodiments, one or more side scan sonars are mounted on the vehicle. The vehicle may utilize the sonar device to map the body of water and to determine a location of the vehicle. For example, the vehicle may use sonar to survey a target area. In some embodiments, these mappings can be processed and combined to produce a map of the surveyed area. The vehicle may implement a simultaneous localization and mapping (SLAM) process that builds a map of the vehicle's environment from sensor data while simultaneously or concurrently using that map to localize the vehicle.

In some embodiments, the method may include determining that a target object is detected within the area. Based on the surveying, the processor can process the sonar data to determine if profiles associated with certain types of objects of interest are detected. For example, the profiles of the object of interest can represent boats, ships, or man-made structures.

In some embodiments, the method may include detecting a battery level of the rechargeable battery. If the battery level of the rechargeable battery is above a threshold value, the vehicle, the vehicle may continue to survey the body of water. If the battery level of the rechargeable battery is below a threshold value, the vehicle can begin the process for harnessing wave energy to recharge the rechargeable battery. For example, if the battery level is less than 50% of full battery power (e.g., less than 50%, less than 40%, less than 30%, less than 25%, or less than 20%), the method may continue to harnessing wave energy.

The method 600 may include detecting a phase of a wave in the body of water, based on information from the processor of the detected phase (640). The vehicle can include a phase detection system including a plurality of pressure taps, and corresponding pressure differential sensors between the plurality of pressure taps, disposed around the vehicle body to measure the position and velocity of the vehicle and movement of waves. In some embodiments, the vehicle may include an underwater navigation system using a depth gauge, azimuth, speedometer, or GPS signal as an auxiliary navigation sensor. A processor can process the information from the phase detection system to detect a phase of a wave motion. For example, the phase of the wave can correspond to the crest, backside, trough, or face of the wave.

The method 600 may include orienting the vehicle to lag the phase of the wave based on the detected phase of the wave (650). In some embodiments, the vehicle can be oriented orthogonal to the phase of the wave. For example, orienting the vehicle to lag the phase of the wave may include controlling the vehicle velocity to be perpendicular to the orbit velocity of the wave motion. In some embodiments, the vehicle may lag the phase of wave by at least 60° (e.g., from 60° to 120°, from 70° to 110°, from 75° to 105°, from 80° to 110°, from 85° to 100°, or from 90° to 100°). For example, the vehicle may lag the phase of wave by about 90°. The method may include iteratively adjusting the orientation of the vehicle based on the detected phase of the wave. The phase detection system can continuously detect the phase of the wave motion. The processor can process the information from the phase detection system to iteratively adjust the orientation of the vehicle. In one example, the wave motion may be irregular causing the motion of the wave to vary. In this example, the phase detection system can continuously detect the phase of the wave motion to adjust the orientation of the vehicle.

The method 600 may include synchronizing an inertial acceleration of the vehicle to movement of the wave (660). After the phase of the wave is detected and the vehicle is oriented to lag the phase of the wave, the motor-generator can supply thrust to the rotor to synchronize the movement of the vehicle to the movement of the wave. In some embodiments, synchronizing the movement of the vehicle may include adjusting the velocity and direction of travel based on the detected movement of the waves. For example, synchronizing the inertial acceleration of the vehicle to movement of the wave may include accelerating the vehicle in a direction of the movement of the wave. The motor-generator can provide an initial thrust to synchronize movement of the vehicle with the movement of the wave. The movement of the wave provides a tangential lift to the vehicle that is greater than a drag of the vehicle.

The vehicle can travel in a loop trajectory relative to the movement of the wave. In the loop trajectory, the acceleration of the vehicle is in the vertical axis when taken from the vehicle body. In some embodiments, the motion of the wave is in the sagittal plane of the vehicle. The vehicle can begin inertial acceleration in the loop trajectory at an initial position to a final position. The initial position and the final position are substantially the same position. The movement of the wave forces the vehicle from the initial position to the final position after the inertial acceleration of the vehicle is synched with the wave motion.

The method 600 may include switching the motor-generator to the second quadrant for generation mode to convert energy from the movement of the wave to electrical energy (670). The generator converts wave motion energy into electrical energy to charge the onboard rechargeable battery of the vehicle. For example, the vehicle includes a motor-generator that provides a first quadrant for motor mode and a second quadrant for generation mode. As a motor, the motor-generator consumes electricity (flows in) to make mechanical power, and as a generator, motor-generator consumes mechanical power (e.g., wave motion) to produce electricity (flows out). In motor mode, the propellers of the rotor exert torque in a first direction to provide thrust for the propellers. In generation mode, the propellers of the rotor may exert torque in a second direction to extract mechanical energy from the wave.

In some embodiments, after the inertial acceleration of the vehicle is synced with the movement of the wave, the motor-generator is switched to the second quadrant for generation mode. In generation mode, the propellers of the rotor can be positioned in the second direction to use wave energy to propel the vehicle and simultaneously extract power from the wave. The method may include storing electrical energy derived from the wave in a rechargeable battery (680).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6. Finally, although the steps of the method of FIG. 6 are listed as distinct steps, the disclosure contemplates that any of the steps may be performed in combination (e.g., simultaneously and concurrently).

In some embodiments, a method of for harnessing wave energy according to another embodiment is provided. The method may include providing a vehicle to a body of water. The vehicle can be any vehicle described herein. The vehicle may include a phase detection system comprising a plurality of pressure taps disposed around the vehicle body. The phase detection system is configured to detect a plurality of parameters of a wave. For example, the plurality of parameters may include detecting or measuring wave velocity, wave length, wave period, wave frequency, wave height, or combinations thereof. The method may include submerging the vehicle to a depth in the body of water. The method may include detecting one or more parameters of the wave in the body of water based on information from the processor. The method may include navigating the vehicle to a position adjacent a surface of the wave. The portion of the vehicle is based on the one or more parameters of the wave. The method may include surfing the wave.

In some embodiments, the detected parameter of the wave is the period of the wave. For example, the phase detection system may detect a short period wave. The vehicle can surf along short period waves. For example, when a short period wave is detected, the vehicle can be positioned under the leading face of the wave adjacent the surface of the body of water. The vehicle can be positioned in a region between the crest and the trough of the wave. In some embodiments, the vehicle is positioned underneath a surface of the wave by 1 to 5 times the diameter of the vehicle. For example, the vehicle can be positioned a full diameter of the vehicle body beneath of the surface of the wave or two times the diameter of the vehicle body beneath of the surface of the wave.

Figure 11:
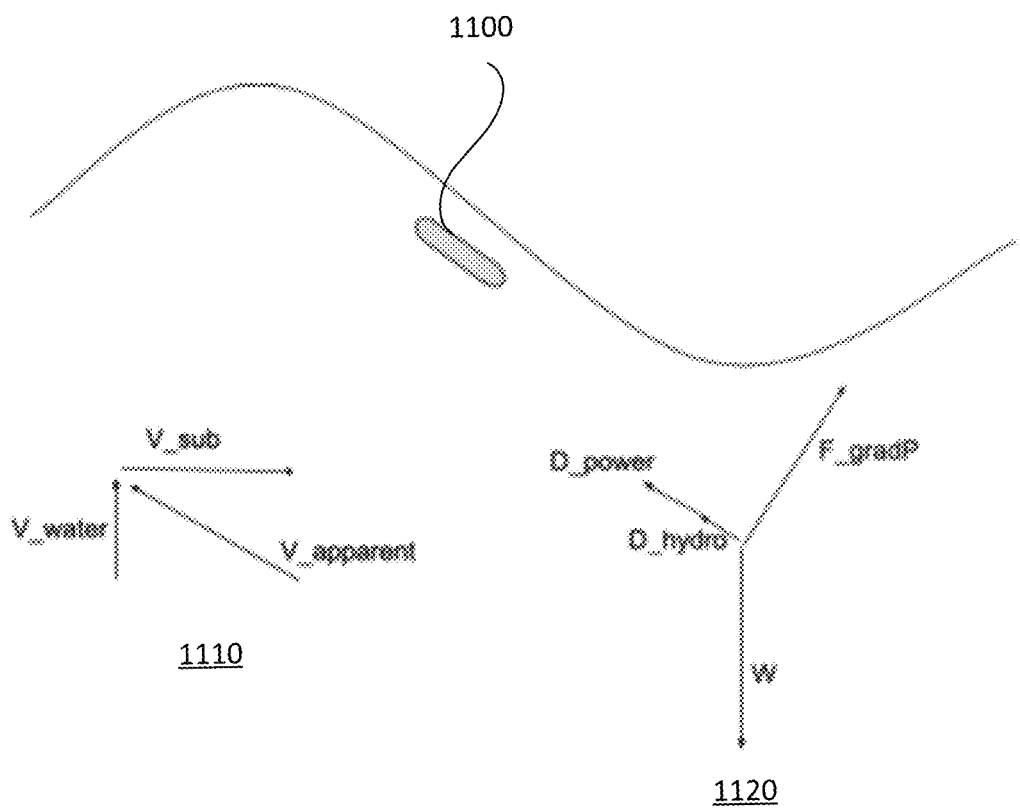
FIG. 11 illustrates a vehicle surfing a short period wave and corresponding velocity and force graphs according to some embodiments.

FIG. 11 shows a vehicle 1300 surfing underneath the surface of a short period wave. In this illustration, the wave is traveling from left to right. For short period waves, the vehicle 1300 may stay substantially stationary relative to the surface of the wave while the wave is moving relative to the body of water. Therefore the vehicle 1300 is phase locked with the wave under the surface of the wave, but is moving through the water using the heave from the wave motion. For these short period waves, once the vehicle is up to speed and is phase locked with the wave, the vehicle can draw power from the wave while moving with the wave motion. For example, the velocity diagram 1110 shows the vehicle moving to the right (V_sub) and the water heaving up (V_water) results in an apparent water flow (V_apparent) at the vehicle that is oriented along a diagonal direction. The force diagram 1120 shows that gravity (W) is pulling the vehicle down, but the pressure of the wave causes a pressure gradient (F_gradP). The pressure gradient from the wave draws the vehicle forward and is greater than the hydrodynamic drag from the vehicle (D_hydro) of the vehicle. The residual pressure gradient from the wave that is greater than the drag forces can be extracted by the motor-generator by introducing a power drag (D_power) by operating the motor-generator in generator mode. For example, a motor-generator of the vehicle can be switched to the second quadrant for generation mode to convert energy from the movement of the wave to electrical energy when surfing the wave. The electrical energy derived from the wave can be stored in a rechargeable battery.

In some embodiments, the detected parameter of the waves can be used to determine if ships are nearby or if bow waves are being produced by large ships. In some embodiments, the vehicle can detect a bow wave. For example, a bow wave can be produced from a ship. The vehicle described herein is capable of speeds in excess of 25 knots. The vehicle speed would allow the vehicle to intercept the bow waves of a variety of ships, including fast ships, for example, cargo tankers. Once the vehicle is phase locked with the bow wave, the vehicle can surf across the body of water, along with the motion of the ship, and generate power while surfing the bow wave. The vehicle can then drop off and catch another bow wave (e.g., produced from another large ship) heading in a desired direction. Many ships traveling through the ocean have satellite beacons that provide information related to the ship's position. Therefore, the vehicle can include one or more sensors, for example, sonar sensors, that can be utilized to detect nearby ships that may be producing bow waves. In some embodiments, in addition to the use of wave surfing during transit, embodiments of the present invention can also be applied in the context of a vehicle that can serve as a continuously deployed support AUV leading a ship. Appendix C provides further details regarding phase-locking and surfing waves to extract wave energy.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for harnessing wave energy, the method comprising:
providing a vehicle to a body of water, the vehicle comprising:
a vehicle body comprising two or more wings;
a phase detection system comprising a plurality of pressure taps disposed around the vehicle body;
a processor for processing information from the phase detection system to detect a phase of a wave motion;

a rotor coupled to a motor-generator, wherein the motor-generator comprises a first quadrant for motor mode and a second quadrant for generation mode; and a rechargeable battery coupled to the motor-generator;

submerging the vehicle to a depth in the body of water;

operating the motor-generator of the vehicle in the first quadrant of the motor-generator;

detecting a phase of a wave in the body of water based on information from the processor of the detected phase;

orienting the vehicle to lag the phase of the wave based on the detected phase of the wave;

synchronizing an inertial acceleration of the vehicle to movement of the wave;

switching the motor-generator to the second quadrant for generation mode to convert energy from the movement of the wave to electrical energy; and storing the electrical energy derived from the wave in the rechargeable battery.

2. The method of claim 1, wherein the vehicle travels in a loop trajectory relative to the movement of the wave.

3. The method of claim 2, wherein the vehicle is oriented to be perpendicular to an orbit velocity of the wave.

4. The method of claim 2, wherein the vehicle begins inertial acceleration in the loop trajectory at an initial position to a final position, wherein the initial position and the final position are substantially the same position.

5. The method of claim 4, wherein the movement of the wave forces the vehicle from the initial position to the final position after the inertial acceleration of the vehicle is synchronized with the wave motion.

6. The method of claim 1, wherein the two or more wings of the vehicle provide a lift and to drag ratio ranging from 14:1 to 40:1.

7. The method of claim 1, wherein a ratio of a volume of the vehicle body, raised to the two-thirds power ($V^{2/3}$), to a total surface area of the two or more wings ranges from 2:1 to 10:1.

8. The method of claim 1, further comprising adjusting, iteratively, an orientation and velocity of the vehicle based on the detected phase of the wave.

9. The method of claim 2, wherein synchronizing an inertial acceleration of the vehicle to movement of the wave comprises continually adjusting, iteratively, a velocity and a radius of travel in the loop trajectory.

10. The method of claim 1, wherein the phase detection system detects one of a crest, backside, trough, and face of the wave to determine an orientation of the vehicle.

11. The method of claim 1, wherein the vehicle lags the phase of the wave from 60° to 120° based on an orbit of the wave.

12. The method of claim 11, wherein the vehicle lags the phase of the wave by about 90°.

13. The method of claim 1, wherein synchronizing the inertial acceleration of the vehicle to movement of the wave comprises providing an initial thrust to synchronize movement of the vehicle with the movement of the wave.

14. The method of claim 1, wherein orienting the vehicle to lag the phase of the wave comprises tilting the vehicle perpendicular to an orbit velocity of the wave.

15. The method of claim 1, wherein the vehicle body comprises an elliptical body comprising a nose region and a tail region, wherein the nose region is rounded and the tail region includes a gradient to a point.

16. The method of claim 1, wherein the movement of the wave provides a tangential lift to the vehicle that is greater than a drag of the vehicle.

17. A method of surveying a body of water, the method comprising:

providing a vehicle to a body of water, the vehicle comprising:

a vehicle body comprising two or more wings;

a phase detection system comprising a plurality of pressure taps disposed around the vehicle body;

a processor for processing information from the phase detection system to detect a phase of a wave motion;

a rotor coupled to a motor-generator, wherein the motor-generator comprises a first quadrant for motor mode and a second quadrant for generation mode; and a rechargeable battery coupled to the motor-generator;

operating the motor-generator of the vehicle in the first quadrant of the motor-generator;

surveying the body of water;

determining a battery power of the rechargeable battery;

detecting a phase of a wave in the body of water based on information from the processor of the detected phase;

orienting the vehicle to lag the phase of the wave based on the detected phase of the wave;

synchronizing an inertial acceleration of the vehicle to movement of the wave;

switching the motor-generator to the second quadrant for generation mode to convert energy from the movement of the wave to electrical energy; and storing the electrical energy derived from the wave in the rechargeable battery.

18. The method of claim 17, wherein the vehicle includes at least one sonar device, wherein surveying comprises using the at least one sonar device to map the body of water.

19. The method of claim 17, wherein the vehicle travels in a loop trajectory relative to the movement of the wave.

20. The method of claim 19, wherein the vehicle is oriented perpendicular to an orbit velocity of the wave.

21. The method of claim 19, wherein the vehicle begins inertial acceleration in the loop trajectory at an initial position to a final position, wherein the initial position and the final position are substantially the same position.

22. The method of claim 21, wherein the movement of the wave forces the vehicle from the initial position to the final position after the inertial acceleration of the vehicle is synchronized with the wave motion.

23. The method of claim 17, further comprising adjusting, iteratively, an orientation and velocity of the vehicle based on the detected phase of the wave.

24. The method of claim 19, wherein synchronizing an inertial acceleration of the vehicle to movement of the wave comprises continually adjusting, iteratively, a velocity and a radius of travel in the loop trajectory.

25. The method of claim 17, wherein the phase detection system detects one of a crest, backside, trough, and face of the wave to determine an orientation of the vehicle.

26. The method of claim 17, wherein the vehicle lags the phase of the wave from 60° to 120° based on an orbit of the wave.

27. The method of claim 17, wherein the vehicle body comprises an elliptical body comprising a nose region and a tail region, wherein the nose region is rounded and the tail region includes a gradient to a point.

28. A method for harnessing wave energy, the method comprising:
  providing a vehicle to a body of water, the vehicle comprising:
    a vehicle body;
    a phase detection system comprising a plurality of pressure taps disposed around the vehicle body, wherein the phase detection system is configured to detect a plurality of parameters of a wave;
    a processor for processing information from the phase detection system to detect wave motion;
    a rotor coupled to a motor-generator, wherein the motor-generator comprises a first quadrant for motor mode and a second quadrant for generation mode; and
    a rechargeable battery coupled to the motor-generator;
  submerging the vehicle to a depth in the body of water;
  detecting one or more parameters of the wave in the body of water based on information from the processor;
  navigating the vehicle to a position adjacent a surface of the wave, wherein the position is based on the one or more parameters of the wave; and
  surfing underneath the wave.

29. The method of claim 28, wherein the plurality of parameters of the wave include wave velocity, wave length, wave period, wave frequency, wave height, or combinations thereof.

30. The method of claim 29, wherein the detected parameter of the wave is the period of the wave, wherein the wave is a short period wave.

31. The method of claim 30, wherein the position of the vehicle is under a leading face of the wave adjacent the surface of the body of water.

32. The method of claim 31, wherein the vehicle is between a crest and a trough of the wave.

33. The method of claim 31, wherein the vehicle is positioned underneath a surface of the wave by 1 to 5 times a diameter of the vehicle.

34. The method of claim 28, wherein the wave is bow wave based on the detected parameters of the wave.

35. The method of claim 34, wherein the bow wave is produced from a ship.

36. The method of claim 34, wherein the vehicle further comprises sonar sensors to detect large ships that can produce bow waves.

37. The method of claim 28, further comprising switching the motor-generator to the second quadrant for generation mode to convert energy from movement of the wave to electrical energy when surfing the wave.

38. The method of claim 37, further comprising storing the electrical energy derived from the wave in the rechargeable battery.

* * * * *